United States Patent
Idrees et al.

(10) Patent No.: US 9,946,952 B2
(45) Date of Patent: Apr. 17, 2018

(54) MULTI-SOURCE, MULTI-SCALE COUNTING IN DENSE CROWD IMAGES

(71) Applicant: University of Central Florida Research Foundation, Inc., Orlando, FL (US)

(72) Inventors: Haroon Idrees, Oviedo, FL (US); Imran Saleemi, Orlando, FL (US); Mubarak Shah, Winter Park, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 967 days.

(21) Appl. No.: 14/315,058

(22) Filed: Jun. 25, 2014

(65) Prior Publication Data

US 2018/0005071 A1 Jan. 4, 2018

Related U.S. Application Data

(60) Provisional application No. 61/839,195, filed on Jun. 25, 2013.

(51) Int. Cl.
*G06K 9/00* (2006.01)
*G06K 9/46* (2006.01)
*G06T 7/73* (2017.01)

(52) U.S. Cl.
CPC .............. *G06K 9/4638* (2013.01); *G06T 7/74* (2017.01); *G06T 2207/30242* (2013.01)

(58) Field of Classification Search
None
See application file for complete search history.

(56) References Cited

U.S. PATENT DOCUMENTS

| 2009/0296989 | A1* | 12/2009 | Ramesh | G06K 9/00771 382/103 |
| 2013/0113934 | A1* | 5/2013 | Hotta | G06K 9/00778 348/143 |

OTHER PUBLICATIONS

Arandjelovic. Crowd detection from still images. BMVC. 2008: 1-10.

(Continued)

*Primary Examiner* — Delomia L Gilliard
(74) *Attorney, Agent, or Firm* — Nilay J. Choksi; Smith & Hopen, P.A.

(57) ABSTRACT

A method for counting individuals in an image containing a dense, uniform or non-uniform crowd. The current invention leverages multiple sources of information to compute an estimate of the number of individuals present in a dense crowd visible in a single image. This approach relies on multiple sources, such as low confidence head detections, repetition of texture elements (using SIFT), and frequency-domain analysis to estimate counts, along with confidence associated with observing individuals in an image region. Additionally, a global consistency constraint can be employed on counts using Markov Random Field. This caters for disparity in counts in local neighborhoods and across scales. The methodology was tested on a new dataset of fifty (50) crowd images containing over 64,000 annotated humans, with the head counts ranging from 94 to 4,543. Efficient and accurate results were attained.

19 Claims, 21 Drawing Sheets
(17 of 21 Drawing Sheet(s) Filed in Color)

(56) References Cited

OTHER PUBLICATIONS

Azencott et al., Texture classification using windowed fourier filters. IEEE Transactions on Patter Analysis and Machine Intelligence. 1997. vol. 19 (No. 2):148-153.

Brostow and Cipolla. Unsupervised bayesian detection of independent motion in crowds. Proceedings of the 2006 IEEE Computer Society Conference on Computer Vision and Pattern Recognition (CPVR '06). 2006: 1-8.

Chan et al., Privacy preserving crowd monitoring: Counting people without people models or tracking. Proceedings of the 2008 IEEE Computer Society Conference on Computer Vision and Pattern Recognition (CPVR '08). 2008: 1-7.

Chen et al., Feature mining for localised crowd counting. BMVC. 2012: 1-11.

Cho et al., A neural-based crowd estimation by hybrid global learning algorithm. IEEE Transactions on Systems, Man, and Cybernetics—Part B: Cybernetics. 1999. vol. 29 (No. 4): 535-541.

Felzenszwalb et al., A discriminatively trained, multiscale, deformable part model. IEEE Computer Society Conference on Computer Vision and Pattern Recognition (CVPR '08). 2008: 1-8.

Felzenszwalb and Huttenlocher. Efficient belief propagation for early vision. Int. J. Comput. Vision. 2006. vol. 70 (No. 1): 41-54.

Ferryman and Ellis. Pets2010: Dataset and challenge. 7th IEEE International Conference on Advanced Video and Signal Based Surveillance (AVSS '10). 2010: 1-8.

Ge and Collins. Marked point processes for crowd counting. Proceedings of the 2009 IEEE Computer Society Conference on Computer Vision and Pattern Recognition (CVPR '09). 2009: 2913-2920.

Kong et al., Counting pedestrians in crowds using viewpoint invariant training. BMVC '05. 2005: 1-10.

Kratz and Nishino. Anomaly detection in extremely crowded scenes using spatio-temporal motion pattern models. Proceedings of the 2009 IEEE Computer Society Conference on Computer Vision and Pattern Recognition (CVPR '09): 2009: 1446-1453.

Lempitsky and Zisserman. Learning to count objects in images. Advances in Neural Information Processing Systems 23 (NIPS 2010). 2010: 1-9.

Leung and Malik. Recognizing surface using three-dimensional textons. Proceedings of the 7th IEEE International Conference on Computer Vision (ICCV '99). 1999. vol. 2: 1010-1017.

Mi et al., Estimating the number of people in crowded scenes by mid based foreground segmentation and head-shoulder detection. 19th International Conference on Pattern Recognition (ICPR '08). 2008: 1-4.

Ma et al., Crowd density analysis using co-occurrence texture features. 5th International Conference on Computer Sciences and Convergence Information Technology (ICCIT '10). 2010: 170-175.

Marana et al., Automatic estimation of crowd density using texture. International Workshop on Systems and Image Processing (IWSIP '97). 1997: 1-5.

Melina. How is crowd size estimated? Live Science. Sep. 4, 2010. Date Accessed Sep. 22, 2014. http://www.livescience.com/8578-crowd-size-estimated.html.

Rabaud and Belongie. Counting crowded moving objects. IEEE Computer Society Conference on Computer Vision and Pattern Recognition (CVPR '06). 2006: 1-7.

Rodriguez et al., Density-aware person detection and tracking in crowds. IEEE International Conference on Computer Vision (ICCV '11). 2011: 2423-2430.

Ryan et al., Crowd counting using multiple local features. In Digital Image Computing: Techniques and Applications. 2009: 81-88.

Wang et al., Unsupervised activity perception by hierarchical bayesian models. IEEE conference on Computer Vision and Pattern Recognition (CVPR '07). 2007: 1-8.

Xiang and Gong. Beyond tracking: Modelling activity and understanding behaviour. IJCV. 2006. vol. 67 (No. 1): 21-51.

Zhou et al., Higher-order svd analysis for crowd density estimation. CVIU. 2012. vol. 116: 1014-1021.

Zhu et al., What are textons? IJCV. 2005. vol. 62 (No. 1/2): 121-143.

* cited by examiner (These figures are intentionally blurry.)

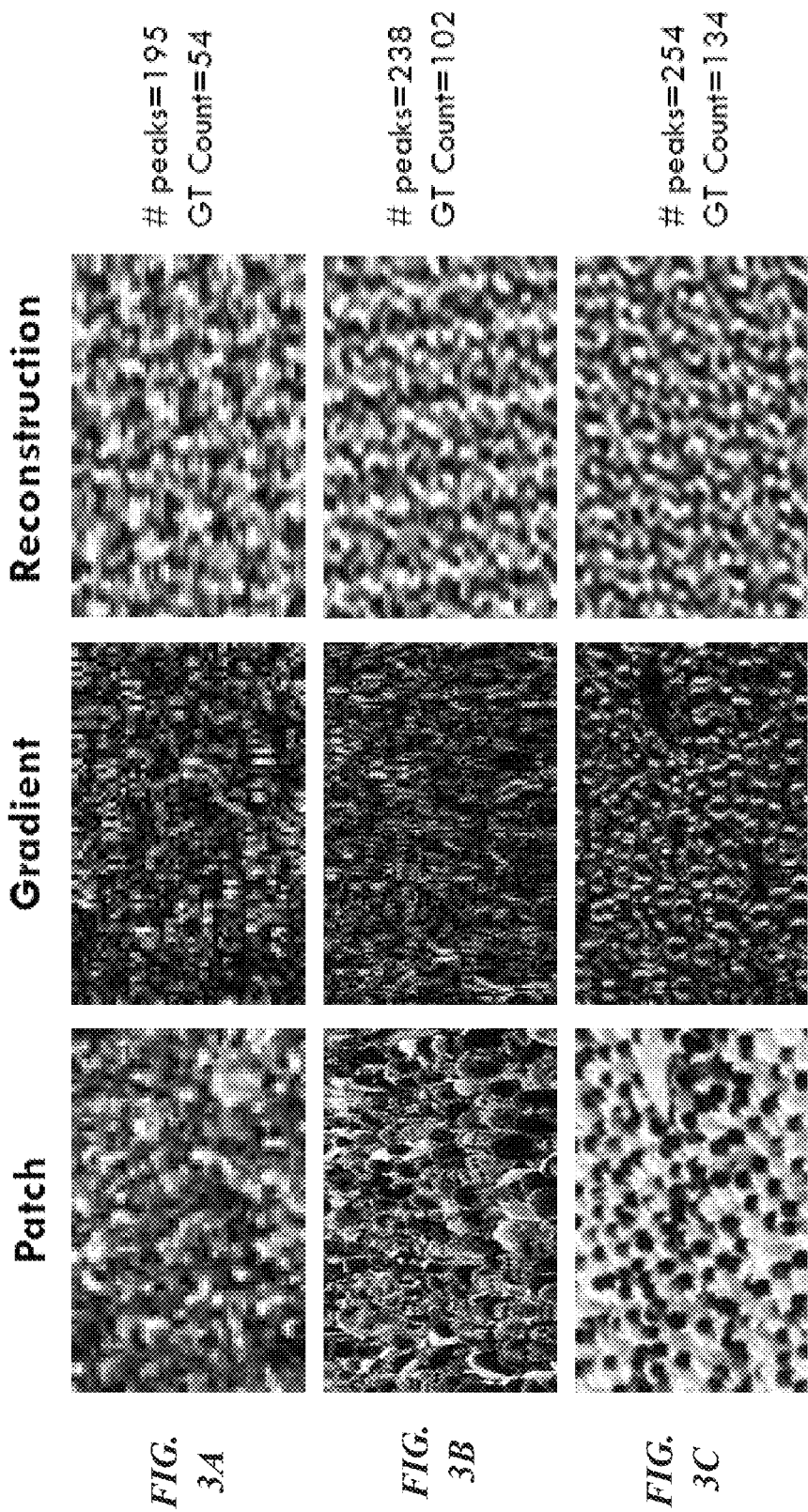

FIG. 6A    FIG. 6B    FIG. 6C
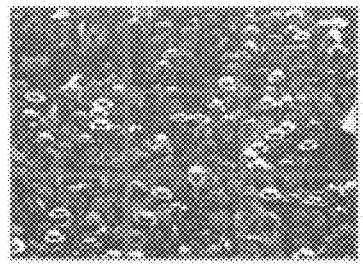 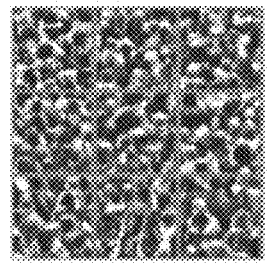 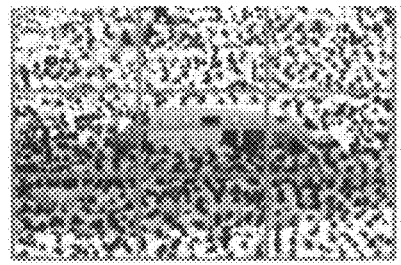
Patches
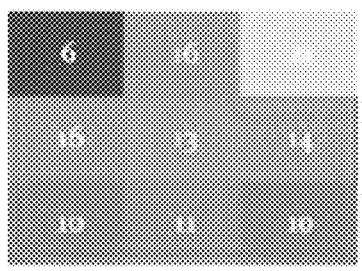 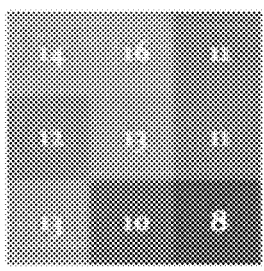 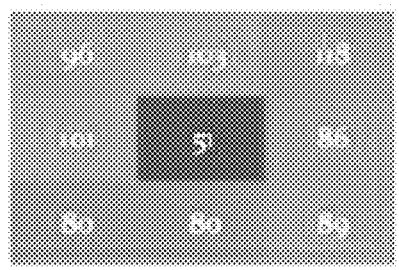
Ground Truth
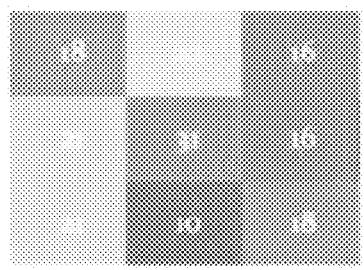 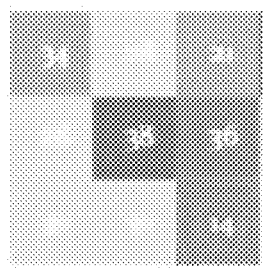 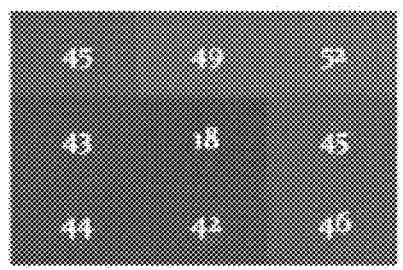
Before MRF
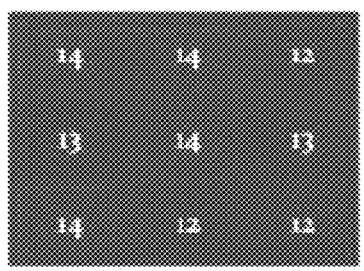 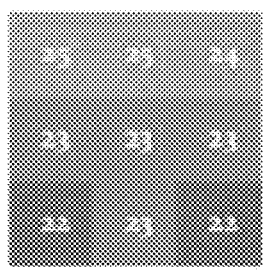 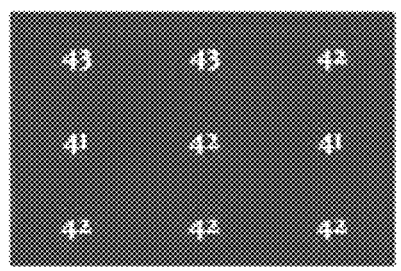
After MRF Least GT Count - Error: 34
Ground Truth: 94  Estimated: 128

Most GT Count - Error: 1993
Ground Truth: 4543  Estimated: 2550

Minimum Error - Error: 2
Ground Truth: 426  Estimated: 428

Maximum Error - Error: 2046
Ground Truth: 3333  Estimated: 1287

US 9,946,952 B2

MULTI-SOURCE, MULTI-SCALE COUNTING IN DENSE CROWD IMAGES

CROSS-REFERENCE TO RELATED APPLICATIONS

This nonprovisional application is a continuation of and claims priority to provisional application No. 61/839,195, entitled "Multi-Source Multi-Scale Counting in Dense Crowd Images", filed Jun. 25, 2013, the entirety of which is incorporated herein by reference.

FEDERALLY SPONSORED RESEARCH OR DEVELOPMENT

This invention was made with Government support under Grant No. W911NF-09-1-0255 awarded by the United States Army Research Laboratory. The government has certain rights in the invention.

BACKGROUND OF THE INVENTION

1. Field of the Invention

This invention relates, generally, to image processing. More specifically, it relates to counting individuals in a crowd and/or estimating crowd density.

2. Brief Description of the Prior Art

The problem of counting the number of objects, specifically people, in images and videos arises in several real world applications including crowd management, design and analysis of buildings and spaces, and safety and security. In certain scenarios, obtaining the people count is of direct importance, e.g., in public rallies, marathons, public parks, and transportation hubs, etc. The manual counting of individuals in very dense crowds is an extremely laborious task, but is performed nonetheless by experienced personnel when needed.

Computer vision research in the area of crowd analysis has resulted in several automated and semi-automated solutions for density estimation and counting. Practical application of most existing techniques, however, is constrained by two important limitations: (1) inability to handle crowds of hundreds or thousands (high density, see FIGS. 1A-1B) rather than a few tens of individuals (low-to-medium density) [4, 5]; and (2) reliance on temporal constraints/information in crowd videos [20], which are not applicable to the more prevalent still images.

Most existing methods can be categorized by the application scenario and experimental setup. Some methods proposed in the conventional art for crowd detection perform image segmentation without actual counting or localization [1], while others simply estimate the coarse density range within local regions [24]. In terms of experimental data, most of the existing algorithms for exact counting have been tested on low to medium density crowds, e.g., USCD dataset with density of 11-46 people per frame [4], Mall dataset with density of 13-53 individuals per frame [5], and PETS dataset containing 3-40 people per frame [9]. However, an effective methodology is not known for higher densities, for example even about 94-4,543 individuals per frame or an average of about 1,280 people per image. Such high density implies that an individual may occupy so few pixels that it can neither be detected, nor can its presence be verified given the location, which are key requirements in existing techniques.

Appearance based feature descriptors like SIFT are also known to be useful to estimate the so-called texture elements or textons [25]. This observation has been used successfully for crowd detection in [1], although not for counting or localization.

Additionally, Fourier transform/analysis has been used extensively in texture analysis [2], and specifically in crowd analysis [17]. Given geometrically arranged texture elements, the Fourier transform can provide reliable estimates of the texton counts [14]. In the domain of crowd counting however, the application of frequency analysis is severely limited due to two main reasons: (1) the spatial arrangement of texture elements is very irregular, and (2) the Fourier transform is not useful in localizing the repeating elements.

Further, person detection for counting individuals, present in an image or video, has been employed in [10, 15]. This category of methods, however, is not useful for relevant kinds of images, because human, or even head and face detection, in these images is difficult due to severe occlusion and clutter, low resolution, and few pixels per individuals due to foreshortening.

Brostow et al. [3] and Rabaud et al. [19] count moving objects by estimating contiguous regions of coherent motion. Computation of such patterns of motion were also proposed in [22, 23, 12], but without any application to the problem of crowd counting. These algorithms require video frames as input, with reasonably high frame rate for reliable motion estimation, but are not suitable to still images of crowds, or even videos if the individuals in the crowd show nominal or no motion, e.g., political gatherings and concerts. Further, counting in videos assumes the testing video being similar to the training video (i.e., same scene). Thus, it is inapplicable to images showing different scenes or any images at all.

Another category of techniques proposed for crowd counting relies on estimation of direct relationships between low level or local features and counts, by learning regression functions. Such a function can be global [4, 6, 11, 21] where a single function's parameters are learned for the entire image or video. For example, in [4], motion is segmented into groups, and the segment, edge, and texture features are computed, followed by GPR. These methods have the implicit assumption, however, that the density is roughly uniform regardless of the location where the feature is computed. This assumption is largely invalid in most real world scenarios due to perspective, changes in viewpoint, and changes in crowd density.

The problems associated with global feature regression can be alleviated by relaxing this assumption. Methods such as [16] propose to divide an image into cells and perform regression individually for each cell, counting by using texture features and then summing. These methods [16, 13] aim to compensate for problems associated with foreshortening, and local geometric distortions due to perspective. One key problem with this approach, however, is that the local context, or spatial consistency constraints, are ignored as information across local regions is not shared.

Chen et al. [5] have recently proposed that information sharing among regions should allow more accurate and robust crowd counting. They propose a single multi-output model for joint localized crowd counting based on ridge regression. Their proposed framework employs interdependent local features from local spatial regions as input, and people count from individual regions as multidimensional structured output. The approach of Chen et al., however, cannot be applied to scenarios with crowds of more than a few tens of people.

Accordingly, what is needed is an improved method of counting individuals in a dense, non-uniform crowd and/or method of estimating crowd density. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a methodology for accurately estimating individuals in an image including a dense crowd is now met by a new, useful, and nonobvious invention.

In certain embodiments, the current invention is a non-transitory tangible computer-readable media having computer-executable instructions for performing a method by running a software program on a computer, where the computer operates under an operating system and where the method includes issuing instructions from the software program to count or estimate a number of individuals in an image of a dense, uniform or non-uniform crowd. In other embodiments, the current invention is a computer-implemented method of counting or estimating a number of individuals in an image of a dense, uniform or non-uniform crowd. The instructions or method include receiving and displaying the image on an electronic display device, such as a computer monitor, where the image includes a group of individuals in a dense, uniform or non-uniform crowd. The image is divided into a series of patches, where a patch includes a pattern of peaks. Repetitions of the pattern are detected, where a periodic occurrence of the peaks in the repetitions indicate a first estimated count of the individuals in the patch based on a medium granularity of the patch. Additionally, objects associated with the individuals in the image are detected and localized via head detection in order to automatically identify a second estimated count of the individuals in the patch based on a large granularity of the patch. Further, a database is received, where the database includes a plurality of descriptions of local features that may or may not be associated with the individuals being counted in the patch. The local features are detected in the patch, where local features that are associated with individuals being counted indicated a third estimated count of individuals in the patch based on a small granularity of the patch. The first, second, and third estimated counts of individuals are inputted into a multidimensional vector. Each layer of the multidimensional vector are automatically swept to determined beliefs at each layer, resulting in a patch count for the patch, wherein an evaluation of data term or unary cost for the patch at each layer is independent of the layers above or below that layer. The foregoing steps are repeated for each patch, thus automatically computing a resulting estimated count of the image based on the beliefs of each patch.

Optionally, during the step of detecting and localizing objects, a filter may be applied corresponding to heads of the individuals being counted.

Scale and confidence may be incorporated into the first, second, and third estimated counts for minimizing threshold of detection of the individuals as a result of the image being occluded. In this case, the first, second, and third estimated counts would include the scales and confidences before being combined and input into the multidimensional vector.

Optionally, prior to calculating the first estimated count, a gradient image, $\nabla(P)$, of the image and applying a low-pass filter, $f(\xi) > f(\xi_o) = 0$, to remove high frequency content.

Prior to calculating the first estimated count, the image may be reconstructed via inverse Fourier transform, and local maximas in the reconstructed image can be detected after alignment and non-maximal suppression, where the number of local maximas can indicate an estimate for the first estimated count. In a further embodiment, entropy, mean, variance, skewness, and kurtosis of the reconstructed image and of a difference image can be determined after detecting the peaks but prior to calculating the first estimated count. The difference image is an absolute difference between the reconstructed image and a gradient image of said image. In this case, the first estimated count would be normalized for a size of the patch.

The step of sweeping each layer of the multidimensional vector may include conducting four (4) sweeps at a bottom layer of the multidimensional vector to determine the beliefs for intermediate nodes of the multidimensional vector above the bottom layer, followed by conducting four (4) sweeps at a second layer of the multidimensional vector above the bottom layer to determine the beliefs at the second layer. In this case, this step would be repeated but in the opposite direction, i.e., beginning with sweeping the second layer, followed by sweeping the bottom layer.

A smoothness constraint may be applied to a spatial neighborhood of the patch to improve accuracy of the patch count using a Markov random field.

The descriptions of local features may describe external objects that are not associated with the individuals being counted (e.g., a car, sky, grass, etc.). In an embodiment, external objects included in the database are automatically discarded from the third estimated count of the individuals in the patch, such that the third estimated count of the individuals include the local features associated with the individuals minus the local features not associated with the individuals.

In other embodiments, the current invention is a non-transitory tangible computer-readable media or a computer-implemented method, as described previously, including one or more—or even all—of the foregoing limitations described herein.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The patent or application file contains at least one drawing executed in color. Copies of this patent or patent application publication with color drawings will be provided by the Office upon request and payment of the necessary fee.

For a fuller understanding of the invention, reference should be made to the following detailed description, taken in connection with the accompanying drawings, in which:

FIG. 2A is one of the few images where head detection gives reasonable results. False negatives and positives are still evident in both images.

FIGS. 3A-3C depict three examples of counting through Fourier analysis. The first column shows three (3) original patches. The second column shows the gradient. The third column shows corresponding reconstructed patches. The positive correlation is evident from the number of local maximas in the reconstructed patch, and the ground truth counts shown at the bottom.

FIGS. 6A-6C depicts results after MRF-based inference in three examples, respectively. Three (3) nonets are shown from different images in the "Patches" row. The ground truth counts are shown in the "Ground Truth" row. The estimated counts before MRF inference are shown in the "Before MRF" row. The estimated counts after MRF inference are shown in the "After MRF" row. The patches from only one layer are shown herein.

FIGS. 7A and 7B show the extreme ends of the dataset in terms of counts. FIG. 7C shows the image with lowest error. FIG. 7D shows the image with highest error.

FIG. 9A shows Normalized Absolute Difference (an error measure). FIG. 9B shows the actual and estimated counts.

DETAILED DESCRIPTION OF THE PREFERRED EMBODIMENT

Figure 1A:
FIG. 1A shows five (5) arbitrary images from the dataset used herein. On average, each image in the crowd counting dataset contains around 1280 humans.
Figure 1B:
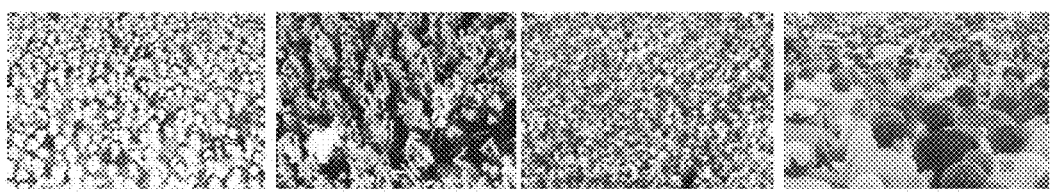
FIG. 1B shows four (4) patches from different images at original resolution.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

Given an image, an objective of certain embodiments of the current invention is to estimate the number of people in the image or estimate the density of people in the image. The density of people, i.e., the number of people per unit area, in an arbitrary crowded image is rarely uniform and varies from region to region. This variation in density may be inherent to the scene that the image captures (different distribution of individuals in different parts of the scene) or it may arise due to the viewpoint and perspective effects of the camera. Therefore, a crowded scene cannot be analyzed in its entirety for counting. Thus, to estimate the number or density of individuals in an image, the current invention begins by counting individuals in small patches uniformly sampled over the image. However, even though the density varies across the image, it does so smoothly, suggesting the density in adjacent patches should be similar.

The issues of variation in density and smooth variation are separately discussed herein. When counting people in patches, the density is assumed to be uniform but it is implicitly assumed that the number of people in each patch is independent of adjacent patches. Once density or counts is estimated in each patch, the independence assumption is removed and placed in multi-scale Markov Random Field to model the dependence in counts among nearby patches.

In contrast to conventional images and videos and counting methods, the current algorithm and methodology is described herein and was tested on still images containing between about 94 and about 4,543 people per image, with an average of about 1,280 people over fifty (50) images in the dataset with about 64,000 annotations. This testing will be described in further detail as this specification continues.

The current approach is motivated by the fact that in extremely dense crowds of people, no single feature or detection method is reliable enough to provide an accurate count due to low resolution, severe occlusion, foreshortening, and perspective. Indeed, even the state-of-the-art human, head, or face detectors perform poorly in such scenarios. However, it can be observed that densely-packed crowds of individuals can be treated as a texture, albeit irregular and inhomogeneous at a coarse scale. This texture begins to correspond to a harmonic pattern, as is the case in regular textures, at a finer scale. Furthermore, there does exist a spatial relationship that is expected to constrain the counting estimates in neighboring local image regions in terms of similarity of counts.

It can also be observed that, in derived intensity spaces such as image derivative or edges, groups of individuals are likely to exhibit an increased level of similarity. Therefore, in addition to supervised training of human or head detectors, appearance based feature descriptors, like SIFT, are also useful to estimate the so called texture elements or textons [25]. This observation has been used successfully for crowd detection in [1], although not for counting or localization. The goal in using appearance based descriptors for localized patches is to estimate repeating structures in the image, but with the important distinction that such image patches are not expected to fully contain a person, rather the textons can represent a single part of a person, multiple parts, or multiple people and their parts.

Another objective of the certain embodiments of the current invention is the use of frequency-domain analysis in crowd counting.

Figure 11:
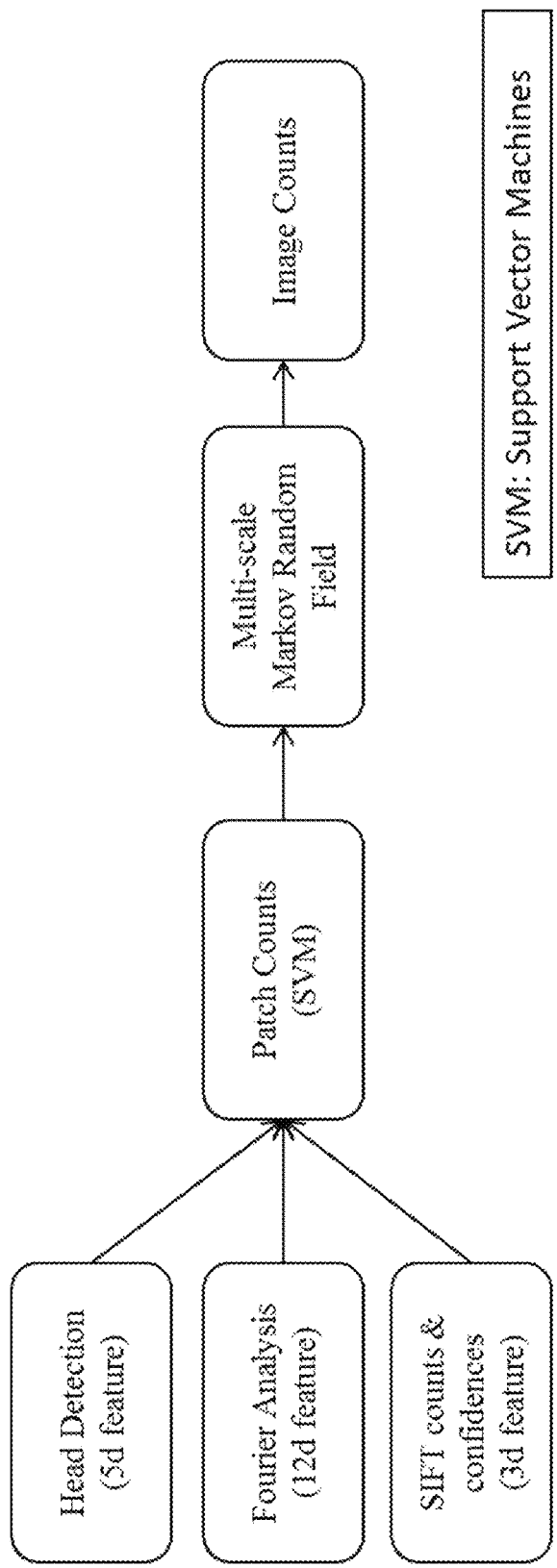
FIG. 11 is a flow chart showing a generalized framework of an embodiment of the current invention.

In order to overcome the drawbacks of the prior art, certain embodiments of the current invention can be generally described as follows in a non-limiting manner, as seen in FIG. 11. A Fourier analysis is employed, along with head detections and interest-point based counts, in local neighborhoods on multiple scales to avoid the problem of irregularity in the perceived textures emanating from images of dense crowds. The count estimates from this localized multi-scale analysis are then aggregated, subject to global consistency constraints.

Further, in order to leverage multiple estimates from distinct sources, the corresponding confidence maps should be comparable and in the same space. For instance, the Fourier transform might not be directly useful in this regard since it cannot be combined with count estimate maps in the image domain. The low-to-medium frequency component of image region is therefore reconstructed, and the reconstructed image is then compared with the original image after alignment. This process provides two important pieces of information: (1) the estimated count per local region, and (2) a measure of error relative to the original image.

Combining the three sources—Fourier analysis, interest points, and head detection—with their respective confidences, counts are computed at localized patches independently, which are then globally constrained to obtain an estimate of count for the entire image. Since the data terms are evaluated independently at different scales, the smoothness constraint has to be applicable to spatial neighborhoods as well as immediate neighbors at different scales. A solution is described herein to obtain counts from multi-scale grid MRF, which infers the solution simultaneously at all scales while enforcing the count consistency constraint.

Further, person detection for counting individuals, present in an image or video, has been employed in [10, 15]. This category of methods, however, is not useful for relevant kinds of images, because human, or even head and face detection, in these images is difficult, due to severe occlusion and clutter, low resolution, and few pixels per individuals caused by foreshortening. This fact is demonstrated herein by reporting quantitative results of detection on the tested crowd image dataset.

Applications of certain embodiments of the current invention can be, for example, management for safety and surveillance (deployment of law enforcement personnel, anomaly detection), volume of commuters (development of public transportation infrastructure), indicator of political significance of a rally or protest based on number of people, etc.

Counting in Patches

Given a patch P, the counts from three different and complementary sources are estimated, alongside confidences for those counts. The three sources can later be combined to obtain a single estimate of count for that patch using the individual counts and confidences. Since the correct scale of image at which to perform the analysis is also unknown in advance, the image can be divided with patches of different sizes (3D-MRF).

As will become clearer as this specification continues, when counting in patches, images are analyzed in multiple granularities—SIFT analyzes local gradients (small granularity), Fourier analysis attempts to quantize repetitive patterns (medium granularity), and head detection looks for complete heads (large granularity).

Hog-Based Head Detections

The simplest approach to estimate counts is through human detections. However, a quick glance at images of dense crowds reveals that the bodies are almost entirely occluded, leaving only heads for counting and analysis in the larger granularity of the patch/image since human detection is not typically feasible in dense crowds. It is contemplated that any method or model can be used herein for counting and analyzing the heads or other body parts depicted in the images. For example, the Deformable Parts Model [7] trained on INRIA Person dataset has been used, where only the filter corresponding to head was applied to the images. Often, the heads are partially occluded, though, so a lower threshold for detection can be used as well.

Figure 2B:
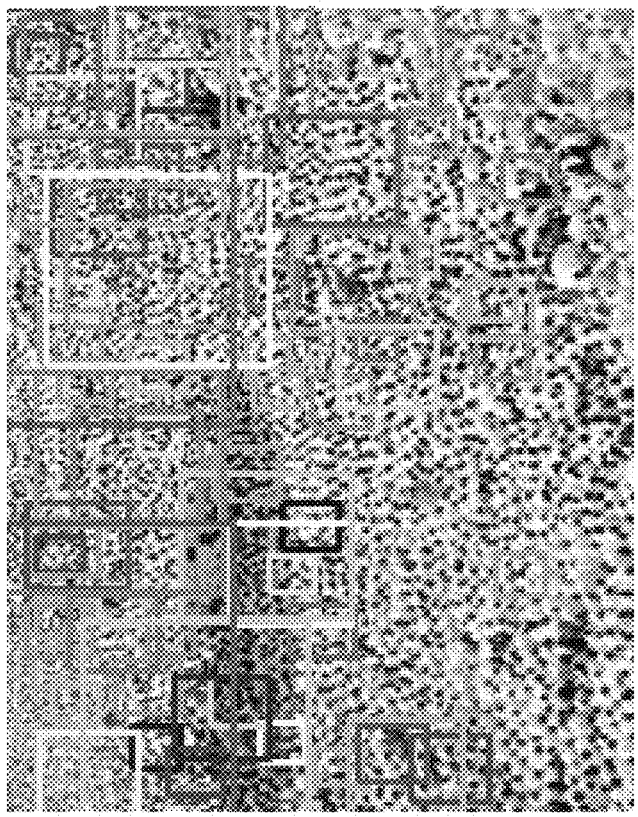
FIGS. 2A and 2B depict results of head detection.
Figure 2A:
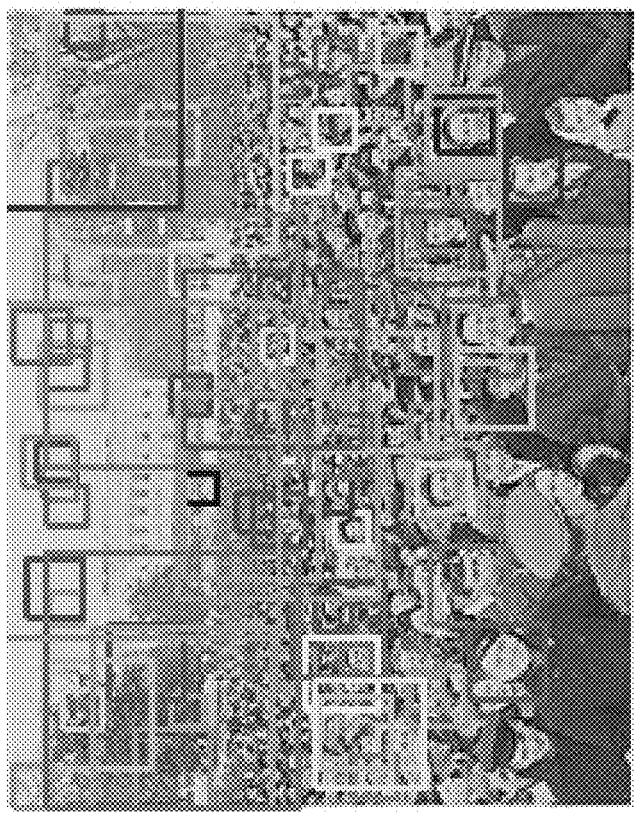

There are typically many false negatives and positives since the images are inherently difficult (see FIGS. 2A-2B). As such, head detections, for example those seen in FIGS. 2A-2B, can be accompanied with scale and confidence. For each patch, the following was used: number of head detections/counts, $\eta_H$; mean of scale, $\mu_{H,s}$; variance/standard deviation of scale, $\sigma_{H,s}$; and mean of confidence $\mu_{H,c}$; and variance/standard deviation of confidence, $\sigma_{H,c}$. The consistency in scale and confidence is a measure of how reliable head detections are in that particular patch.

Fourier Analysis

Figure 12:
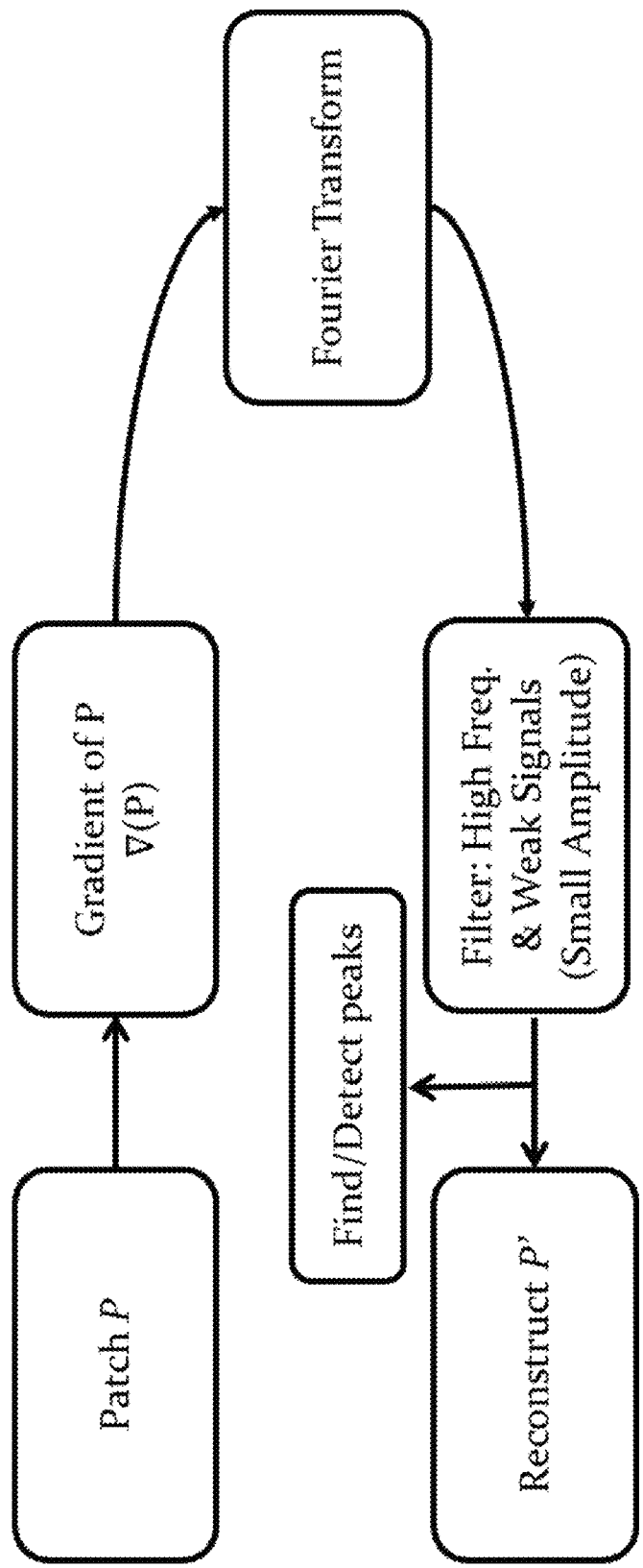
FIG. 12 is a flow chart showing a step-by-step process of a Fourier analysis.

A Fourier analysis can be performed to obtain an estimated count of individuals in the patch based on the medium granularity of the image/patch. When a crowd image contains thousands of individuals, with each individual occupying only tens of pixels, especially those far away from the camera in an image with perspective distortion, histograms of gradients do not impart any useful information. In other words, head detections alone can fail when head size is too small or distorted. However, a crowd is inherently repetitive in nature, since all humans appear the same from a distance. The repetitions, as long as they occur consistently in space, i.e., crowd density in the patch is uniform, can be captured by Fourier Transform, $f(\xi)$, where the periodic occurrence of heads shows as peaks in the frequency domain. Specifically, for a given patch, the gradient image, $\nabla(P)$, is computed, and a low-pass filter, $f(\xi) > f(\xi_o) = 0$, is applied to remove very high frequency content. Next, the low amplitude frequencies are discarded, followed by reconstruction, P', through inverse Fourier Transform. After computing the difference $|P' - \nabla(P)|$, the number of local maximas were found in the reconstructed image (FIGS. 3A-3C) after alignment and non-maximal suppression, which serves as an estimate for the Fourier-based count, $\eta_F$. This flow can be seen in FIG. 12.

In addition, several other measures were computed as well, such as entropy (entropy$_F$) as well as statistical measures related to first four moments—mean ($\mu_F$); variance ($v_F$); skewness (skew$_F$); kurtosis (kurt$_F$)—for both the reconstructed image and difference image $|P'-V(P)|$. The count is normalized for the size of the patch.

Interest Points Based Counting

Interest points are used not only to estimate counts in the small granularity of the patch but also to obtain a confidence as to whether the patch represents the crowd or not. Since environmental aspects (e.g., sky, buildings and trees) naturally occur in outdoor images and since head detection often results in false positives in such regions (see FIGS. 2A-2B) and Fourier analysis is crowd-blind, it is important to discard counts from such patches. For both counting and confidence, scale-invariant feature transform (SIFT) features are obtained and clustered into a database or codebook of size c in order to extract SIFT features and quantize them into c visual words. In order to obtain counts or predict densities using sparse SIFT features, support rector regression is used, utilizing the counts computed at each patch from ground truth.

From the perspective of statistics, the number of individuals in a particular patch can be seen as spatial Poisson counting process with parameter (corresponds to density), $\lambda$, i.e., $N(P) \sim Poisson(\lambda|P|)$, and expected value of $N(P)$ is simply $\lambda|P|$ (counts in a patch). It is assumed that spatial Poisson counting process is non-homogenous and difficult to model over full images; however, it can be performed over patches, each of which are more homogenous, and density can be modeled. There would be one (1) spatial Poisson counting process per patch. Since it is assumed that the density is uniform in the patch, the process is homogenous and $\lambda$ is not a function of location (x, y).

Moreover, the independence assumption among patches gives count for the image, I:

$$N(I)=N(P_1 \cup P_2 \ldots P_N)=N(P_1)+N(P_2)+\ldots+N(P_N)$$

where $P_1, P_2, \ldots P_n$ form a disjoint partition of I. The independence assumption simplifies count estimation, as there is assumed strong dependence among neighbors of a particular patch. Counts are estimated independently, and MRF is used to model the dependence.

Furthermore, due to the sparse nature of SIFT features, interest-point based confidence can be calculated as well. The frequency $\gamma$ of a particular/model feature i in a patch can also be modeled as a Poisson R.V., $p(\gamma_i|crowd)=\exp(-\lambda_i^+)\cdot(\lambda_i^+)^{\gamma_i}/\gamma_i!$ with expected value, $\lambda_i^+$. Given a set of positive examples (+) and negative examples (−), the relative densities (frequencies normalized by area) of the feature vary in positive and negative images, and can be used to identify crowd patches from non-crowd ones. Assuming independence among features, the log-likelihood $\varphi(P)$ of the ratio of patch containing crowd to non-crowd is [1]:

$$\log(\gamma_1^+, \gamma_2^+, \ldots \gamma_c^+ \mid crowd) - \log(\gamma_1^-, \gamma_2^-, \ldots \gamma_c^- \mid \neg crowd) =$$

$$\sum_i^c (\lambda_i^- - \lambda_i^+ + \gamma_i(\log\lambda_i^+ - \log\lambda_i^-))$$

Figure 4A:
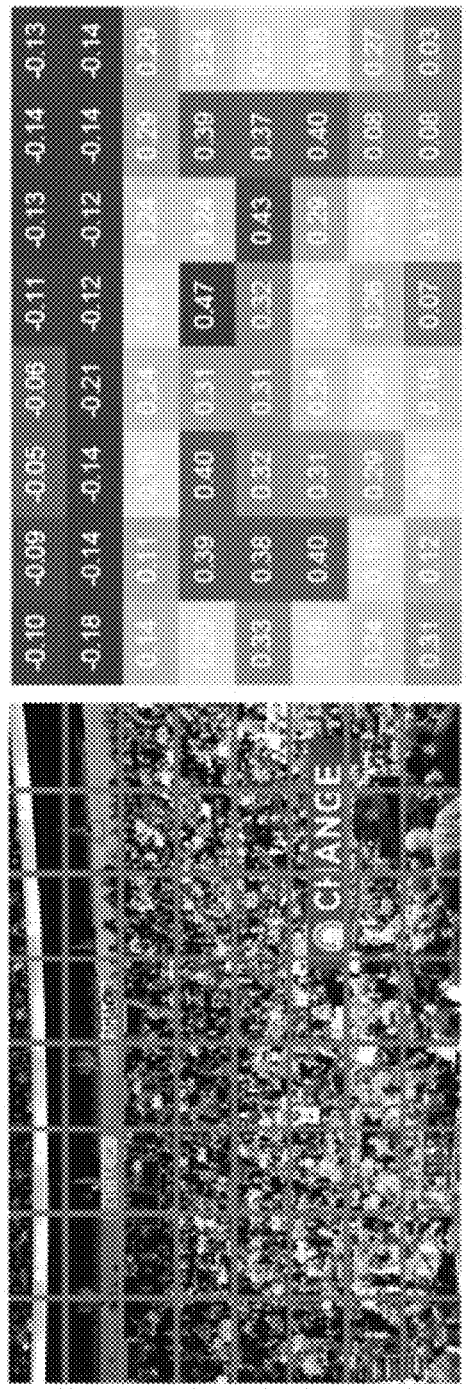
FIGS. 4A and 4B are images with their confidence maps. The images on the left have confidence of crowd likelihood obtained through Eq. 2. In the top image, the gap between stadium tiers gets low confidence of crowd presence. Similarly, patches containing the sky and flood lights in bottom image have low probability of crowd.
Figure 4B:
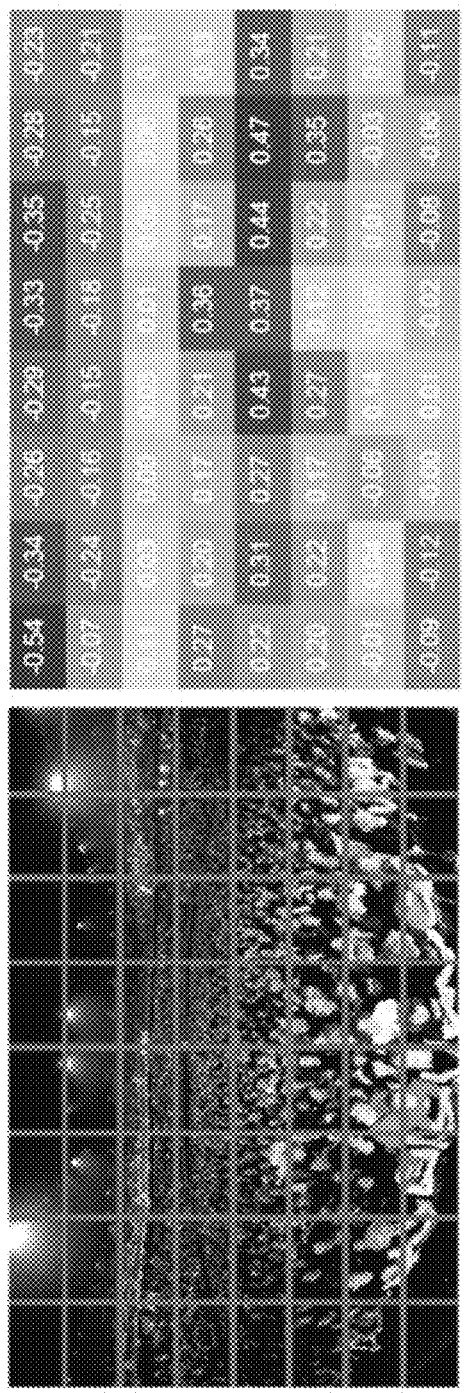

The above equation gives a confidence for presence of a crowd in a patch. The resulting confidence maps are shown in FIGS. 4A-4B for two (2) images.

Fusion of Three Sources

Counts and confidences from the three (3) sources are inputted into a multidimensional vector (e.g., Fourier: 12; head detection: 5; interest-point: 3). For learning and fusion at the patch level, overlapping patches are densely sampled from the training images, and using the annotation, counts for the corresponding patches could be obtained. Computing counts and confidences from the three (3) sources, individual features are scaled and regress using $\epsilon$-SVR to predict densities, with the counts computed from the annotations.

The three sources—Fourier, interest points, head detection—are combined/fused since individual features or detection methods are not reliable (e.g., due to low resolution (fewer resolution per target), severe occlusion, foreshortening, perspective). As will become clearer as this specification continues, when combining the three sources, an unexpected, synergistic effect was seen, such that the results were greater than expected by combining the three sources.

Counting in Images

In order to impose smoothness among counts from different patches, the patches are placed in a three-dimensional Markov random field (MRF) framework with grid structure. Furthermore, although smaller patches have consistent density, they have fewer repetitions or periods and can easily be affected by low-frequency noise. Larger patches, if they have consistent density, have more people, and therefore more periods and better relevant-to-irrelevant frequency ratio. Moreover, it is difficult to ascertain, in advance, the right scale for analysis for a particular image.

Figure 5:
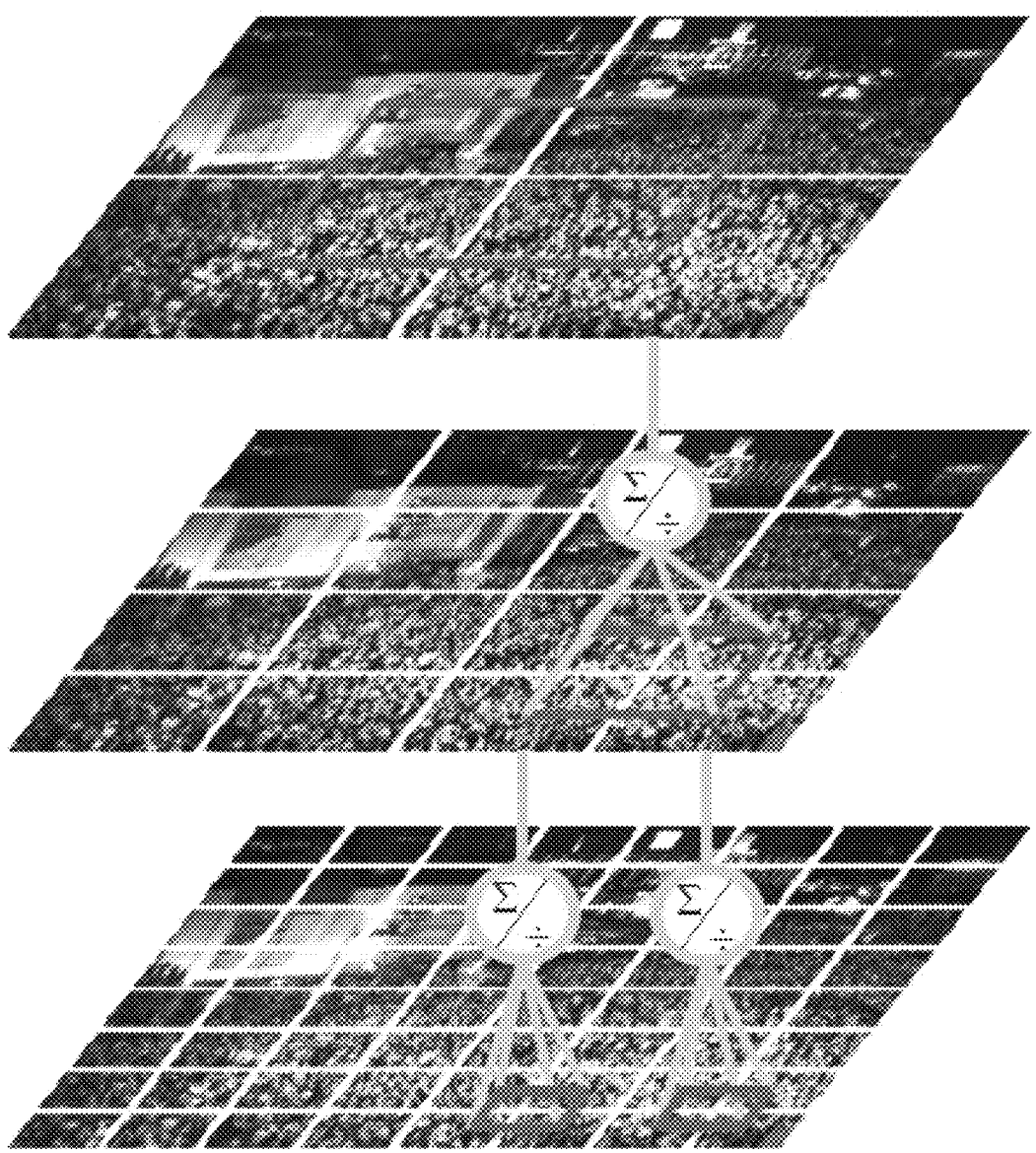
FIG. 5 shows multi-scale Markov random Field for inferring counts for the entire image. The patches in each layer have independent data terms, thus requiring a simultaneous solution for all layers.

This problem lends itself to a multi-scale MRF, an example of which is shown in FIG. 5. The graph can be represented with (V, $\epsilon$) and N are the four neighbors at the same level and intermediate nodes that connect a patch to layers above and below it. There are four (4) sweeps at each layer. It should be noted that this multi-scale MRF is different from other hierarchical models used for images, in that the data term (unary cost) for a patch is evaluated independent of the patches at layers above and below it, whereas in image restoration and stereo, data cost for the patch at the higher level is computed from layer directly below. The energy function is thus given by:

$$E(l) = \sum_{p \in V} D_P(l_p) + \sum_{(p,q) \in N} V(l_p - l_q) \quad (3)$$

where labeling l assigns a label $l_p \in L=\{0, 1, 2, \ldots, C_{max}\}$ for every patch $p \in P$. The data term is quadratic, $D_p(l_p)=\lambda(\eta_p - l_p)^2$ and smoothness term is truncated quadratic, $V(l_p-l_q)=\min((l_p-l_q)^2, \tau)$. The graph is inferred using Max-Product/Min-Sum BP on grid structure [8]. At any time t, the message that node p sends to q for a label $l_q$ is given by, $m_{p \to q}^t(l_q)$:

$$\min_{l_p}\left(V(l_p - l_q) + D_P(l_p) + \sum_{s \in N_p \backslash q} m_{s \to p}^{t-1}(l_p)\right) \quad (4)$$

and the belief for a label $l_q$ of node q at time t can be obtained as:

$$b_q^t(l_q) = D_q(l_q) + \sum_{p \in N_q} m_{p \to q}^t(l_q) \quad (5)$$

The inference starts by sweeping in four directions at the bottom level using Eq. 4, and the beliefs are then evaluated for each patch using Eq. 5. Subsequently, the beliefs in the groups of 2×2 are added, giving the beliefs for the intermediate nodes $b_i^l$ above the bottom layer. The beliefs for the intermediate nodes are computed by summing the counts from the layer below.

After four (4) sweeps at the middle layer, the fifth sweep of messages proceeds from intermediate nodes to the middle layer. This is followed by computation of beliefs at the middle layer. This step repeats for the top layer, and the whole process corresponds to one time step t. Then, the process repeats but from top to bottom. The beliefs at the intermediate nodes are divided (division of count from layer above) for each patch below, i.e., for each patch q in 2×2 group below the intermediate node, its share of beliefs from the layer above is given by $b_{i,q}^{t+1}(l_q) = b_q^t(l_q) \cdot b_i^{t+1}(l_q) / b_i^t(l_q)$. After a fixed number of iterations, the final beliefs can be computed using Eq. 5, and the labels, which have minimum cost in the belief vectors, are selected as the final labels. The sum of labels (counts) at the bottom layer gives the count for the image.

FIGS. 6A-6C show three (3) instances where the estimated count of patch was improved based on neighbors (both spatial and layer). In all cases, the patch under consideration lies in the center of the 3×3 patch set. In the first two columns (FIGS. 6A and 6B), after imposing the smoothness constraint using MRF, the overestimated counts are reduced, becoming closer to ground truth. A special case is shown in the last column (FIG. 6C). The patch in the middle had a much lower count than neighbors, which after inference, increased, becoming similar to its neighbors. Although the new estimate is closer to ground truth, the increase is not necessarily correct since the lower count was due to presence of a non-human object (an ambulance). The last column belongs to the image, which had the highest count in the dataset.

Experiments

Figure 7A:
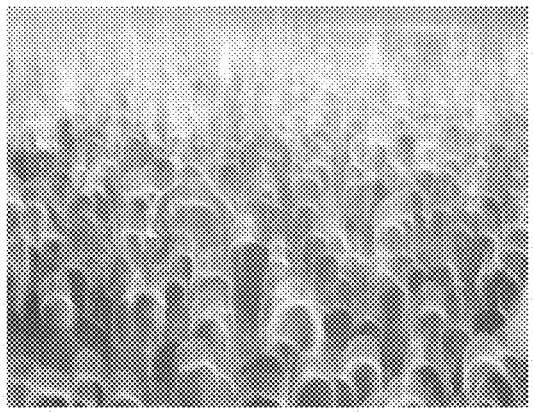
FIGS. 7A-7D are selected images with their respective counts and errors.
Figure 7B:
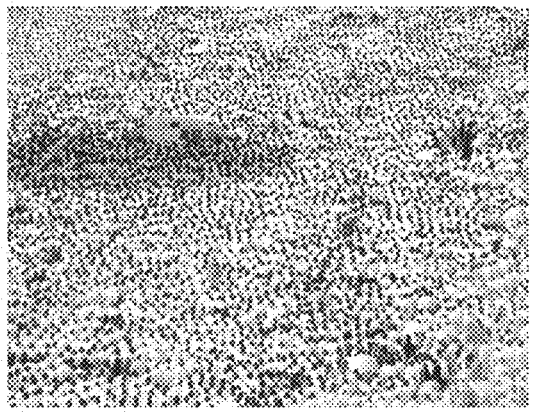
Figure 7C:
Figure 7D:

The dataset was collected from publicly available web images and databases, including FLICKR. The dataset included fifty (50) images (~64,000 annotations) with counts ranging between about 94 and about 4,543 individuals with an average of about 1,280 individuals per image. Much like the range of counts, the scenes in these images also belong to a diverse set of events: concerts, protests, stadiums, marathons, and pilgrimages. One of the images is a painting while another is an abstract depiction of a crowd (the one with the least count, shown in FIG. 7A). Using a simple tool for marking the ground truth positions of individuals, about 63,705 annotations were obtained in the fifty (50) images. Some examples of images with the associated ground truth counts can be seen in FIGS. 7A-7D.

For experiments, the dataset was randomly divided into sets of ten (10), the maximum dimension was reduced to 1024 for computational efficiency, and 5-fold cross-validation was performed. Two simple measures were used to quantify the results: (1) mean and deviation of absolute difference (AD), and (2) mean and deviation of normalized absolute difference (NAD), which was obtained by normalizing the absolute difference with the actual count for each image. AD can be calculated by subtracting ground truth from the estimated count; NAD can be calculated by dividing AD by the ground truth. Since the images were divided into patches, results are reported herein for both patches and images. The quantitative results are presented in Table 1.

The first row (Fourier) in Table 1 shows the results of using counts from Fourier analysis only, giving AD of 703.9 per image and NAD of 84.6 per image. Supplementing it with confidences from various sources, including Eq. 2, improves AD per image by 181.8 and reduces NAD per image by almost one-half, as seen in the second row (F+confidence). Including counts from head detections improves AD marginally to 510.9 per image and does not improve NAD per image, as seen in the third row (Fc+Head). Adding counts from regression on sparse SIFT features reduces error per image in both measures, AD and NAD, giving values of 468.0 and 32.2, respectively, as seen in the fourth row (FHc+SIFT).

TABLE 1

Quantitative results of an embodiment of the current invention, and comparison with Rodriguez et al. [20] and Lempitsky et al. [13] using mean and standard deviation of absolute difference (AD) and normalized absolute difference (NAD) from ground truth. The influence of the individual sources (e.g., Fourier, confidences, head detection, SIFT) is also quantified. The current invention can be seen to outperform both Rodriguez et al. and Lempitsky et al.

| | Error | | | |
|---|---|---|---|---|
| | Per Patch | | Per Image | |
| Method | AD | NAD | AD | NAD |
| Fourier (F) | 13.8 ± 21.3 | 96.4 ± 200.4 | 703.9 ± 682.0 | 84.6 ± 157.3 |
| F + confidence (Fc) | 11.0 ± 19.7 | 58.7 ± 74.9 | 522.1 ± 610.1 | 41.0 ± 31.0 |
| Fc + Head (FHc) | 11.1 ± 19.3 | 63.3 ± 84.0 | 510.9 ± 587.3 | 41.8 ± 30.9 |
| FHc + SIFT (FHSc) | 10.2 ± 18.9 | 53.3 ± 69.5 | 468.0 ± 590.3 | 32.2 ± 27.1 |
| FHSc + MRF (embodiment of current invention) | — | — | 419.5 ± 541.6 | 31.3 ± 27.1 |
| Rodriguez et al. | — | — | 655.7 ± 697.8 | 70.6 ± 102.1 |
| Lempitsky et al. | — | — | 493.4 ± 487.1 | 61.2 ± 91.6 |

Finally, per an embodiment of the current invention, inferring counts for complete images using counts from patches through multi-scale MRF further improves AD taking it to 419.5 per image and improves NAD to 31.3 per image, as seen in the fifth row (FHSc+MRF). It can be observed from the table that standard deviation follows the same trend as mean, the values reducing as more sources are added.

Figure 8A:
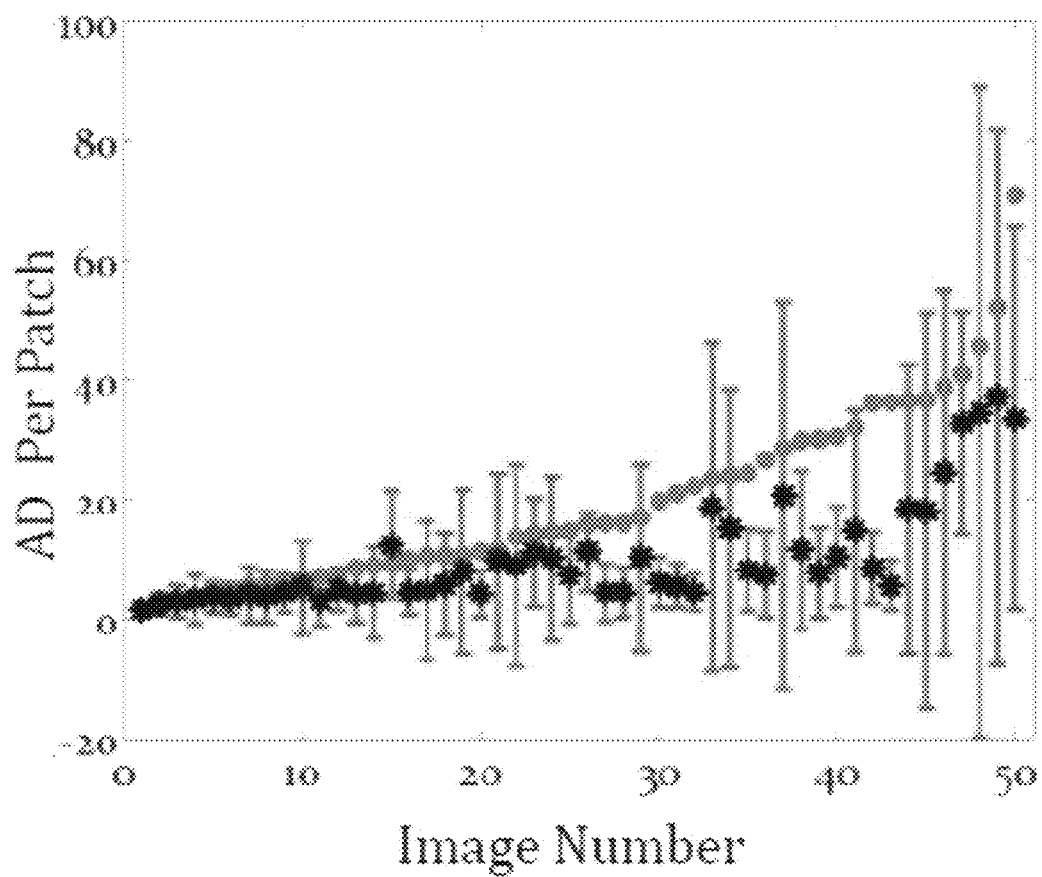
FIG. 8A is a graphical illustration depicting analysis of patch estimates in terms of absolute differences. The x-axis shows image number sorted with respect to actual count. Means are shown in black asterisk, standard deviations with red bars, and ground truth counts with olive dots.
Figure 8B:
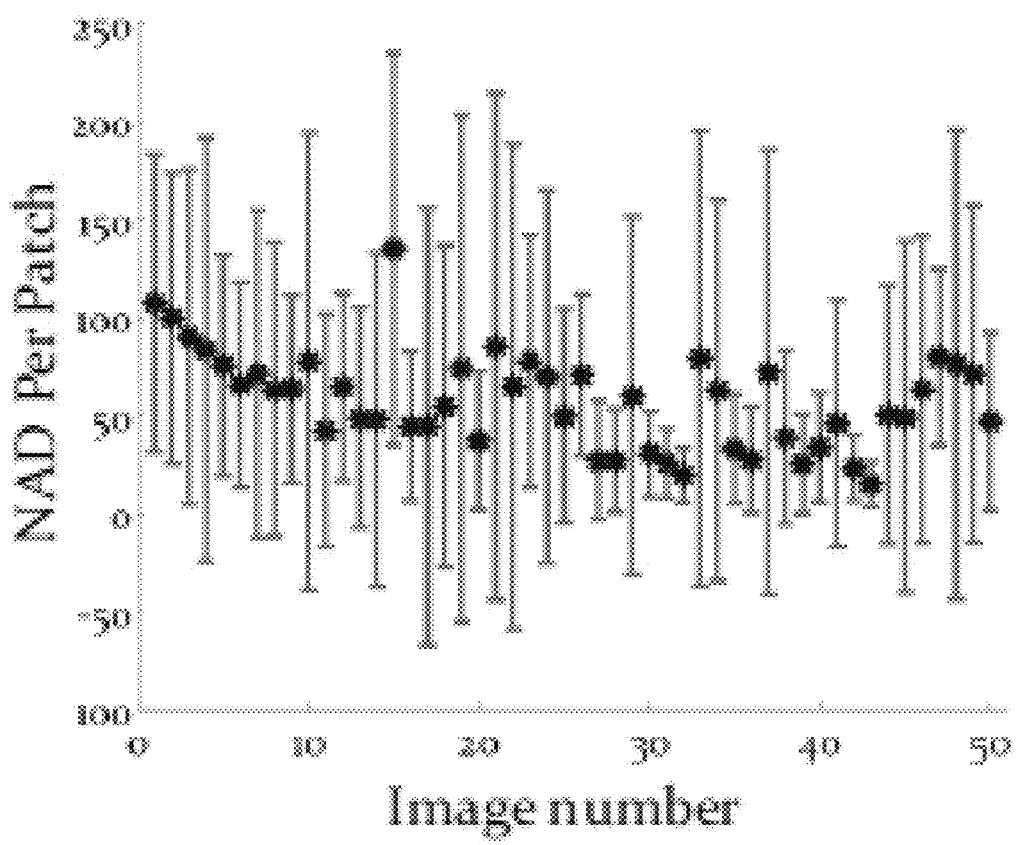
FIG. 8B is a graphical illustration depicting analysis of patch estimates in terms of normalized absolute differences. The x-axis shows image number sorted with respect to actual count. Means are shown in black asterisk and standard deviations with red bars.
Figure 8C:
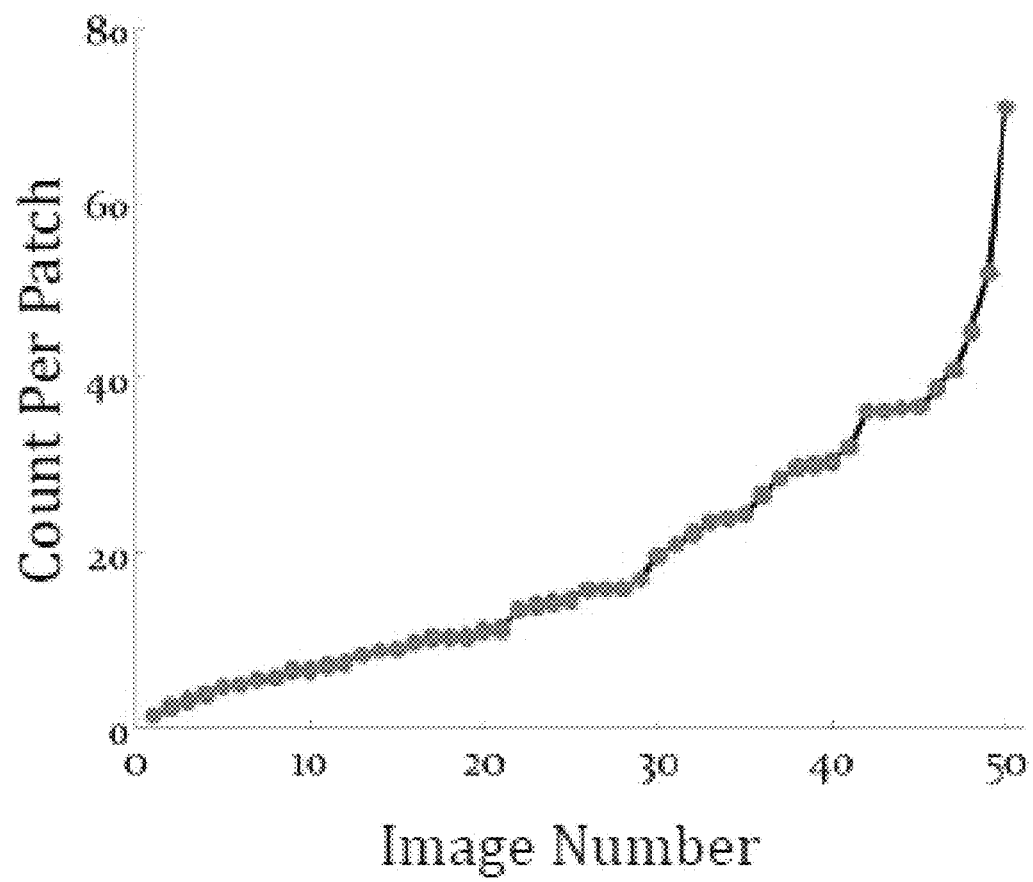
FIG. 8C is a graphical illustrating depicting count per patch versus image.

FIGS. 8A-8B respectively show AD and NAD for patches in the individual images. The mean per patch are shown with black asterisks/dots, the deviations are shown with red bars, and the average of actual counts per patch in that image are shown with olive dots in FIG. 8A. For easier analysis, the x-axis shows images sorted with respect to actual counts in both plots. It can be seen that AD per patch increases as the actual counts increase, except for the images in the range 25 to 45 with corresponding actual counts in the range of 1,000-2,500 per image. Not only does this range boast lowest mean in AD and NAD, but lowest deviations as well, meaning the approach described in this experimentation consistently predicts correct counts for patches in this range. FIG. 8C shows the ground truth count per patch, where the counts increase linearly at the tenth group and then super-linearly as the images proceed.

The reason for better performance in the middle range is may be due to the counts ranging from 94-4,543; as such, the largest count is 4,832% of the smallest count (see FIG. 8B). Forcing the learning algorithm to predict correct estimates at both ends simultaneously may cause an overestimation on the lower end and an underestimation on the higher end, thereby working in favor of the middle range, even though RBF kernel was used for regression on three sources.

For comparison, the methods of Rodriguez et al. [20] and Lempitsky et al. [13] were used; the conventional methods were suitable for this dataset since other methods for crowd counting mostly relate to videos or use human detection and were incapable of being used for testing on this dataset. Due to problems including perspective, occlusion, clutter, and few pixels per person, counting by human detection in such images is nearly impossible. The method presented in Rodriguez et al. [20] relies on head detections, while Lempitsky et al. [13] requires annotated ground truth points for training and learns a regression model using dense SIFT features on randomly selected patches (in other words, learn a mapping function from features to density and search for maximally violated regions). The quantitative results are shown in Table 1.

Figure 9A:
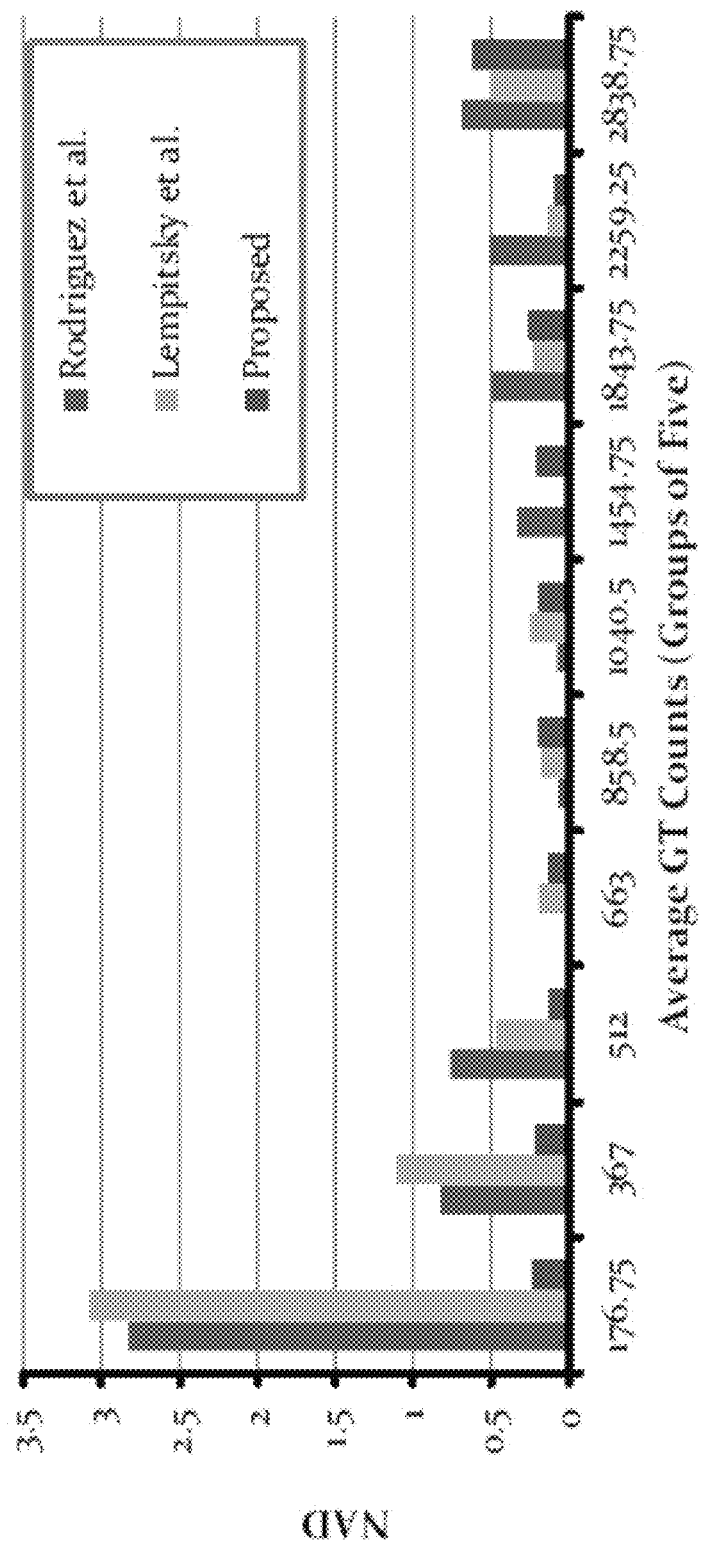
FIGS. 9A and 9B show an analysis of comparison. Bars and lines in red depict [20]; bars and lines in green depict [13]; bars and lines in blue depict the results using an embodiment of the current invention; and ground truth is shown in black.
Figure 9B:
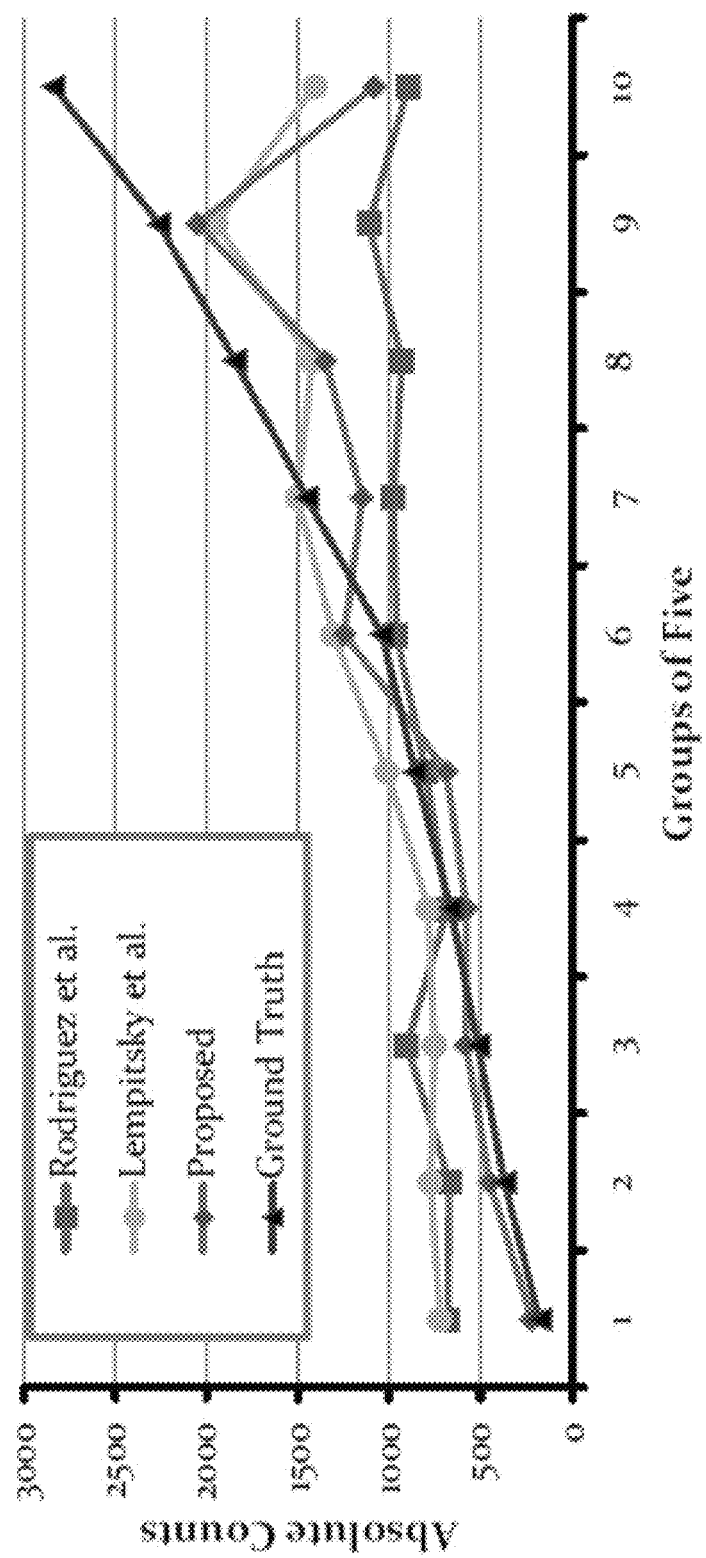
Figure 10A:
FIGS. 10A-10G are a series of images tested with the current invention and compared to ground truth in order to illustrate accuracy of count estimation of the current invention.
Figure 10B:
Figure 10C:
Figure 10D:
Figure 10E:
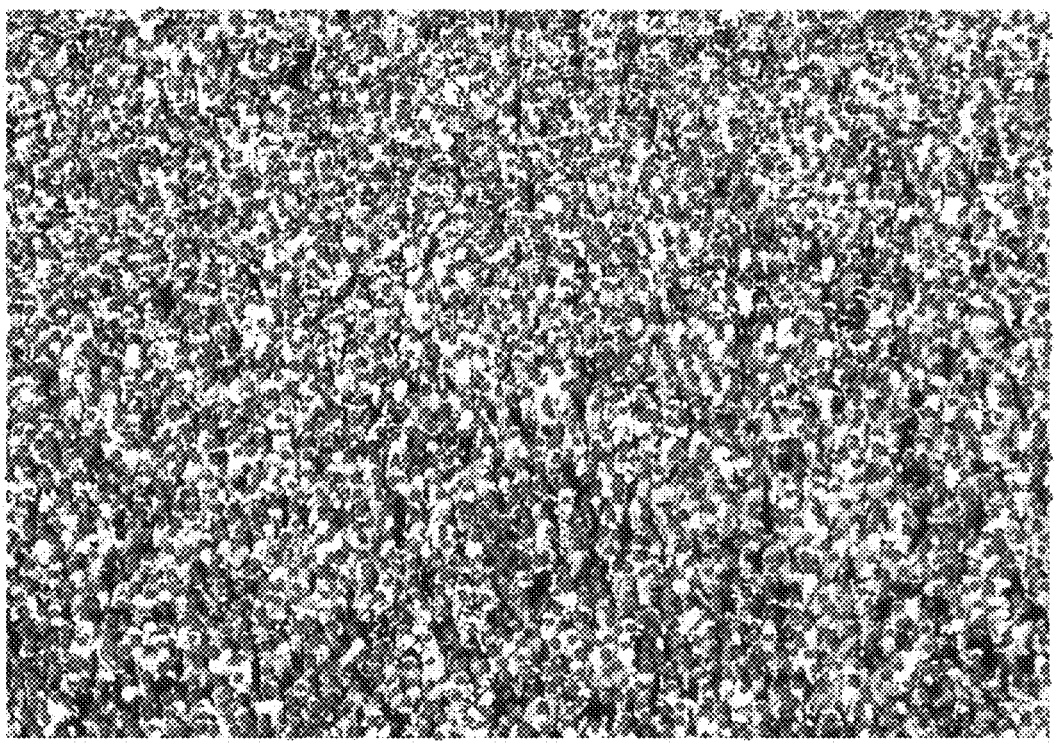
Figure 10F:
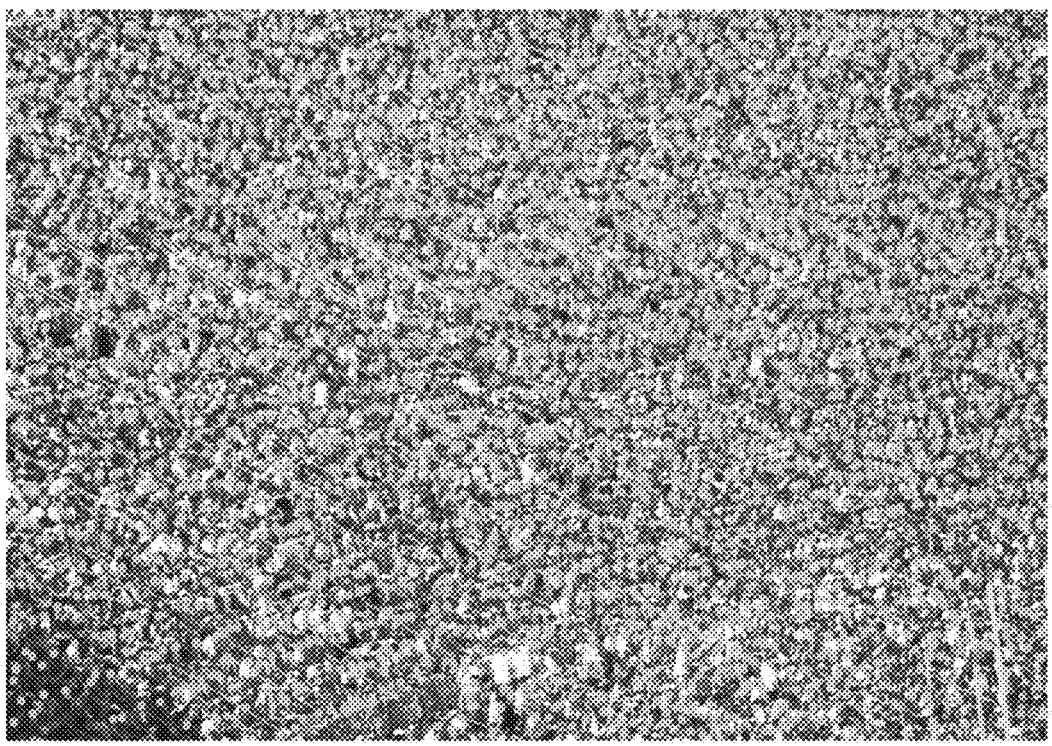
Figure 10G:

FIGS. 9A-9B analyze these numbers of Table 1 according to counts. The results using Rodriguez et al. [20] are in red, the results using Lempitsky et al. [13] are in green, and the results of an embodiment of the current invention are shown blue. In FIG. 9B, the black curve indicates the ground truth. In FIG. 9A, the NAD for ten (10) groups of five (5) images each is shown, where the images are sorted according to ground truth counts. The x-axis shows the average counts of each of the ten (10) groups. Density aware person detection [20] performs best around counts of 1000, but its error increases as counts move away from 1000. The reason for this drawback becomes obvious when the absolute counts output by the method are seen in FIG. 9B, as they are fairly steady across the entire dataset and do not respond well to changes in density. Rodriguez et al. [20] overestimates at lower end and then underestimates at the higher end, resulting in increased absolute errors on both ends. Overall, the counts do not change much in Rodriguez et al.

On the other hand, the MESA-distance [13] performs fairly well at higher counts but gives a high NAD at lower counts (i.e., overestimates at the lower end). The reason lies in the algorithm itself, as it is designed to minimize the maximum AD across images when training. Also, since images with higher counts tend to have higher AD, the learning focuses on such images. The learner gets biased towards high density images, thus producing a lower AD overall, but overestimating at lower counts (FIG. 9B) and giving higher NAD.

As can be seen, however, the embodiment of the current invention was tested and performed well across the entire range, producing steady NAD's across all ten (10) groups.

Finally, all methods underestimated the tenth set and this can be due to several reasons. First, images in this group are very high resolution, and therefore it was less likely to miss individuals while annotating. Since the maximum image size was fixed for the experiments, the images in this group had correct and therefore more annotations than their low-resolution counterparts. Second, a careful look at FIG. 8A indicates that patch density increased super-linearly for this group, which otherwise was linear for first nine groups. Since there are few such images, their patch instances could have been treated as outliers (have higher slack weights) for regression. The last reason may be associated with histograms of features that capture relative frequencies. At very high density, the relative frequencies across patches with different density may become similar, resulting in a loss of discriminative power.

In a substantially similar manner, the current invention was tested on several images with dense, uniform and non-uniform (e.g., image with a perspective/viewpoint such that there is a lower frequency of individuals closer up and a higher frequency of individuals further away; external objects present within a crowd) crowds. Table II compares results achieved by the current invention versus the ground truth in a series of images, seen in FIGS. 10A-10G. As can be seen, the current invention was quite accurate at estimating the number of individuals in a given image.

TABLE II

Results of counting in a series of dense, uniform and non-uniform images, comparing ground truth versus the current invention, and further compared against individual sources.

| FIG. No. | Ground truth | Current invention | Fourier | Head | SIFT |
| --- | --- | --- | --- | --- | --- |
| 10A | 634 | 640 | — | — | — |
| 10B | 1567 | 1590 | — | — | — |
| 10C | 1428 | 1468 | 1128 | 1020 | 960 |
| 10D | 653 | 673 | — | — | — |
| 10E | 2322 | 2203 | 1984 | 1282 | 2059 |
| 10F | 2319 | 2496 | — | — | — |
| 10G | 1344 | 1499 | 879 | 1461 | 1053 |

In conclusion, an approach is presented herein to count the number of individuals in extremely dense, non-uniform crowds, on a scale not discussed previously. Information was combined from three sources in terms of counts, confidences, and different measures at the patch level. Smoothness constraint was then enforced on nearby patches to improve estimates of incorrect patches, thereby producing better estimates at the image level. It can be seen that the current invention scales well to different densities, producing consistent error rates across images with diverse counts.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

REFERENCES

[1] O. Arandjelovic. Crowd detection from still images. In BMVC, 2008.
[2] R. Azencott, J.-P. Wang, and L. Younes. Texture classification using windowed fourier filters. PAMI, 19(2):148-153, 1997.
[3] G. Brostow and R. Cipolla. Unsupervised bayesian detection of independent motion in crowds. In CVPR, 2006.
[4] A. Chan, Z. Liang, and N. Vasconcelos. Privacy preserving crowd monitoring: Counting people without people models or tracking. In CVPR, 2008.
[5] K. Chen, C. Loy, S. Gong, and T. Xiang. Feature mining for localised crowd counting. In BMVC, 2012.
[6] S. Cho, T. Chow, and C. Leung. A neural-based crowd estimation by hybrid global learning algorithm. Systems, Man, and Cybernetics, Part B: Cybernetics, IEEE Transactions on, 29(4):535-541, 1999.
[7] P. Felzenszwalb, D. McAllester, and D. Ramaman. A discriminatively trained, multiscale, deformable part model. In CVPR, 2008.
[8] P. F. Felzenszwalb and D. P. Huttenlocher. Efficient belief propagation for early vision. Int. J. Comput. Vision, 70(1):41-54, October 2006.
[9] J. Ferryman and A. Ellis. Pets2010: Dataset and challenge. In AVSS, 2010.
[10] W. Ge and R. Collins. Marked point processes for crowd counting. In CVPR, 2009.
[11] D. Kong, D. Gray, and H. Tao. Counting pedestrians in crowds using viewpoint invariant training. In BMVC, 2005.
[12] L. Kratz and K. Nishino. Anomaly detection in extremely crowded scenes using spatio-temporal motion pattern models. In CVPR, 2009.
[13] V. Lempitsky and A. Zisserman. Learning to count objects in images. In NIPS, 2010.
[14] T. Leung and J. Malik. Recognizing surface using three-dimensional textons. In ICCV, 1999.
[15] M. Li, Z. Zhang, K. Huang, and T. Tan. Estimating the number of people in crowded scenes by mid based foreground segmentation and head-shoulder detection. In ICPR, 2008.
[16] W. Ma, L. Huang, and C. Liu. Crowd density analysis using co-occurrence texture features. In ICCIT, 2010.
[17] A. Marana, S. Velastin, L. Costa, and R. Lotufo. Automatic estimation of crowd density using texture. In IWSIP, 1997.
[18] R. Melina. How is crowd size estimated?, Live Science, Sep. 4, 2010.
[19] V. Rabaud and S. Belongie. Counting crowded moving objects. In CVPR, 2006.
[20] M. Rodriguez, J. Sivic, I. Laptev, and J. Y. Audibert. Density-aware person detection and tracking in crowds. In ICCV, 2011.
[21] D. Ryan, S. Denman, C. Fookes, and S. Sridharan. Crowd counting using multiple local features. In Digital Image Computing: Techniques and Applications, 2009.
[22] X. Wang, X. Ma, and E. Grimson. Unsupervised activity perception by hierarchical bayesian models. In CVPR, 2007.

[23] T. Xiang and S. Gong. Beyond tracking: Modelling activity and understanding behaviour. IJCV, 67(1):21-51, 2006.
[24] B. Zhou. F. Zhang, and L. Peng. Higher-order svd analysis for crowd density estimation. CVIU, 116(9): 1014-1021, 2012.
[25] S. Zhu, C. Guo, Y. Wu, and Y. Wang. What are textons? IJCV, pages 121-143, 2002.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

Glossary of Claim Terms

Beliefs: This term is used herein to refer to inferences or estimations within each layer and node of a multidimensional vector, based on the sweeps of each layer of the multidimensional vector. The beliefs, when combined, aid in calculating the resulting estimation of individuals in the patch/image.

Data term or unary cost: This term is used herein to refer to parameters or arguments evaluated for each layer of the multidimensional vector and are "independent" for each layer, as opposed to the conventional art, which is dependent on layers above and below.

Dense, uniform or non-uniform crowd: This term is used herein to refer to a tight grouping of individuals taking up either an entire image or a portion of an image (where other portions of the image would be non-individuals, such as a car, grass, sky, etc.).

Difference image: This term is used herein to refer to a sum of absolute differences between two images for the purpose of object recognition in the images.

Estimated count: This term is used herein to refer to a calculation or guess of a number of individuals in a patch or image based on the source used (e.g., Fourier, head detection, interest-point).

Gradient image: This term is used herein to refer to an altered image created from the original image, where the altered image shows the intensity of each pixel of the original image. This intensity level can be used for edge detection in estimating the number of individuals in the relevant patch/image.

Head detection: This term is used herein to refer to a methodology of estimating the number of individuals in a patch or image based on detecting the heads of individuals in the patch or image on a larger granularity scale of the patch or image.

Image: This term is used herein to refer to an optical, still representation of a scene, which generally would include a plurality of individuals.

Local features: This term is used herein to refer to components or aspects of an image that may or may not be associated with the individuals in said image. For example, a local feature can include a description of an individual's head, which would indicate the presence of that individual in that particular region of the image; a local feature can also include a description of a car headlight, which would indicate the absence of that individual in that particular region of the image.

Local maximas: This term is used herein to refer to peaks in an inverse Fourier-based, reconstructed patch, where the peaks indicate an estimated number of individuals in that patch.

Low-pass filter: This term is used herein to refer to a process that allows low-frequency signals to pass and attenuates signals with a frequency higher than a threshold amount.

Minimizing threshold of detection: This term is used herein to refer to a setting in head detection such that a higher number of objects that may appear to be a head is counted as heads (and thus as individuals). This is particularly useful when the heads are occluded in the image, so a lower threshold of detection of heads allows the system to identify objects as heads more readily.

Multidimensional vector: This term is used herein to refer to a field or quantity that considers values from a plurality of sources and outputs a resulting estimate or assessment based on the values inputted. As used herein, estimates from the sources (e.g., Fourier analysis, head detection, interest-point) are inputting into the multidimensional vector, and the patches of the image are analyzes across a plurality of layers to provide a resulting estimate of the number of individuals in the patch/image.

Non-maximal suppression: This term is used herein to refer to a methodology of edge thinning for better defining edges to be identified by the system herein for estimating the number of individuals in a patch/image.

Normalize: This term is used herein to refer to the elimination of redundancy of peaks between a difference image and a reconstructed image in a Fourier analysis, for example, in order to minimize the overestimation of individuals in the patch/image.

Object: This term is used herein to refer to an identifiable component or aspect of an individual. An example of an "object" is an individual's head.

Patch count: This term is used herein to refer to an estimated number of individuals in a particular patch.

Patch: This term is used herein to refer to a portion of an image, where individuals within each patch are counted/estimated based on actual methodological counting or inferences/beliefs deduced from neighboring patches.

Pattern: This term is used herein to refer to a random arrangement of shapes or colors in an image, where the pattern can indicate an estimated number of people in the patch/image when considering the patch/image in its larger granularity scale.

Resulting estimated count: This term is used herein to refer to a final estimation of a number of individuals in the image being analyzed.

Scale and confidence: This term is used herein to refer to a probability that an estimated number of individuals in a patch is an accurate estimation of the actual number of individuals in the patch. When computing a confidence interval on the mean, the mean of a sample is computed in order to help estimate the mean of the population.

Scale-invariant feature transform: This term is used herein to refer to an algorithm for detecting local features in an image. Features of an object are provided via extraction from a training image, and these features are detected in a test image in order to attempt to locate the object in the test image. This is further described in U.S. Pat. No. 6,711,293 to Lowe, which is incorporated herein by reference.

Smoothness constraint: This term is used herein to refer to an inference or approximation of neighboring patches upon estimating individuals in a particular patch.

Spatial neighborhood: This term is used herein to refer to patches that are physically nearby to a particular patch in an image.

Sweeping: This term is used herein to refer to analysis or processing in one or more directions of each layer of a multidimensional vector in order to estimate individuals in a patch/image.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. One or more non-transitory tangible computer-readable media having computer-executable instructions for performing a method by running a software program on a computer, the computer operating under an operating system, the method including issuing instructions from the software program to count or estimate a number of individuals in an image of a dense, uniform or non-uniform crowd, the instructions comprising:

receiving and displaying said image on an electronic display device, said image including a plurality of individuals in said dense, uniform or non-uniform crowd;

dividing said image into a series of patches, wherein a patch of said series of patches includes a pattern of peaks;

detecting repetitions of said pattern, wherein a periodic occurrence of said peaks in said repetitions of said pattern indicate a first estimated count of said individuals in said patch based on a first granularity of said patch;

detecting and localizing objects associated with said plurality of individuals in said image via head detection in order to automatically identify a second estimated count of said individuals in said patch based on a second granularity of said patch, wherein said second granularity of said patch is larger than said first granularity of said patch;

receiving a database including a plurality of descriptions of local features that may or may not be associated with said individuals being counted in said patch;

detecting said local features in said patch, said local features that are associated with said individuals indicating a third estimated count of said individuals in said patch based on a third granularity of said patch, wherein said third granularity of said patch is smaller than said first granularity of said patch;

inputting said first estimated count, said second estimated count, and said third estimated into a multidimensional vector;

automatically sweeping each layer of said multidimensional vector to determine beliefs at said each layer of said multidimensional vector, resulting in a patch count for said patch, wherein an evaluation of data term or unary cost for said patch at a layer of said multidimensional vector is independent of layers above or below said layer;

repeating the foregoing steps with each patch of said series of patches; and automatically computing a resulting estimated count of said image based on said beliefs of said each patch.

2. One or more non-transitory tangible computer-readable media, as in claim 1, further comprising:
applying a filter corresponding to heads of said plurality of individuals during said step of detecting and localizing said objects.

3. One or more non-transitory tangible computer-readable media, as in claim 1, further comprising:
incorporating scale and confidence into said first estimated count, said second estimated count, and said third estimated count for minimizing threshold of detection as a result of said image being occluded,
wherein said first, second, and third estimated counts include said scales and confidences.

4. One or more non-transitory tangible computer-readable media, as in claim 1, further comprising:
computing a gradient image, $\nabla(P)$, of said image; and
applying a low-pass filter, $f(\xi) > f(\xi_o) = 0$, to remove high frequency content prior to calculating said first estimated count.

5. One or more non-transitory tangible computer-readable media, as in claim 1, further comprising:
reconstructing said image via inverse Fourier transform prior to calculating said first estimated count; and
detecting a number of local maximas in said reconstructed image after alignment and non-maximal suppression, said number of local maximas being an estimate for said first estimated count of said number of individuals in said image.

6. One or more non-transitory tangible computer-readable media, as in claim 5, further comprising:
determining entropy, mean, variance, skewness, and kurtosis of said reconstructed image and of a difference image after detecting said peaks but prior to calculating said first estimated count, said difference image being an absolute difference between said reconstructed image and a gradient image of said image; and
normalizing said first estimated count for a size of said patch.

7. One or more non-transitory tangible computer-readable media, as in claim 1, further comprising:
said step of sweeping each layer performed by conducting four (4) sweeps at a bottom layer of said multidimensional vector to determine said beliefs for intermediate nodes of said multidimensional vector above said bottom layer, followed by conducting four (4) sweeps at a second layer of said multidimensional vector above said bottom layer to determine said beliefs at said second layer, and
repeating the foregoing step but beginning with sweeping said second layer, followed by sweeping said bottom layer.

8. One or more non-transitory tangible computer-readable media, as in claim 1, further comprising:
applying a smoothness constraint to a spatial neighborhood of said patch to improve accuracy of said patch count using a Markov random field.

9. One or more non-transitory tangible computer-readable media, as in claim 1, further comprising:
said descriptions including local features describing external objects that are not associated with said individuals being counted in said patch; and automatically discarding an external object included in said database from said third estimated count of said individuals in said patch, said third estimated count including said local features that are associated with said individuals less said local features that are not associated with said individuals.

10. A computer-implemented method of counting or estimating a number of individuals in an image of a dense, uniform or non-uniform crowd, comprising:

receiving and displaying said image on an electronic display device, said image including a plurality of individuals in said dense, uniform or non-uniform crowd;

dividing said image into a series of patches, wherein a patch of said series of patches includes a pattern of peaks;

detecting repetitions of said pattern, wherein a periodic occurrence of said peaks in said repetitions of said pattern indicate a first estimated count of said individuals in said patch based on a first granularity of said patch;

detecting and localizing objects associated with said plurality of individuals in said image via head detection in order to automatically identify a second estimated count of said individuals in said patch based on a second granularity of said patch, wherein said second granularity of said patch is larger than said first granularity of said patch;

receiving a database including a plurality of descriptions of local features that may or may not be associated with said individuals being counted in said patch;

detecting said local features in said patch, said local features that are associated with said individuals indicating a third estimated count of said individuals in said patch based on a third granularity of said patch, wherein said third granularity of said patch is smaller than said first granularity of said patch;

inputting said first estimated count, said second estimated count, and said third estimated into a multidimensional vector;

automatically sweeping each layer of said multidimensional vector to determine beliefs at said each layer of said multidimensional vector, resulting in a patch count for said patch, wherein an evaluation of data term or unary cost for said patch at a layer of said multidimensional vector is independent of layers above or below said layer;

repeating the foregoing steps with each patch of said series of patches; and automatically computing a resulting estimated count of said image based on said beliefs of said each patch.

11. A computer-implemented method as in claim 10, further comprising:
applying a filter corresponding to heads of said plurality of individuals during said step of detecting and localizing said objects.

12. A computer-implemented method as in claim 10, further comprising:
incorporating scale and confidence into said first estimated count, said second estimated count, and said third estimated count for minimizing threshold of detection as a result of said image being occluded, wherein said first, second, and third estimated counts include said scales and confidences.

13. A computer-implemented method as in claim 10, further comprising:
computing a gradient image, $\nabla(P)$, of said image; and
applying a low-pass filter, $f(\xi) > f(\xi_o) = 0$, to remove high frequency content prior to calculating said first estimated count.

14. A computer-implemented method as in claim 10, further comprising:
reconstructing said image via inverse Fourier transform prior to calculating said first estimated count; and
detecting a number of local maximas in said reconstructed image after alignment and non-maximal suppression, said number of local maximas being an estimate for said first estimated count of said number of individuals in said image.

15. A computer-implemented method as in claim 14, further comprising:
determining entropy, mean, variance, skewness, and kurtosis of said reconstructed image and of a difference image after detecting said peaks but prior to calculating said first estimated count, said difference image being an absolute difference between said reconstructed image and a gradient image of said image; and
normalizing said first estimated count for a size of said patch.

16. A computer-implemented method as in claim 10, further comprising:
said step of sweeping each layer performed by conducting four (4) sweeps at a bottom layer of said multidimensional vector to determine said beliefs for intermediate nodes of said multidimensional vector above said bottom layer, followed by conducting four (4) sweeps at a second layer of said multidimensional vector above said bottom layer to determine said beliefs at said second layer, and
repeating the foregoing step but beginning with sweeping said second layer, followed by sweeping said bottom layer.

17. A computer-implemented method as in claim 10, further comprising:
applying a smoothness constraint to a spatial neighborhood of said patch to improve accuracy of said patch count using a Markov random field.

18. A computer-implemented method as in claim 10, further comprising:
said descriptions including local features describing external objects that are not associated with said individuals being counted in said patch; and
automatically discarding an external object included in said database from said third estimated count of said individuals in said patch, said third estimated count including said local features that are associated with said individuals less said local features that are not associated with said individuals.

19. One or more non-transitory tangible computer-readable media having computer-executable instructions for performing a method by running a software program on a computer, the computer operating under an operating system, the method including issuing instructions from the software program to count or estimate a number of individuals in an image of a dense, non-uniform crowd, the instructions comprising:
receiving and displaying said image on an electronic display device, said image including a plurality of individuals in said dense, uniform or non-uniform crowd;

dividing said image into a series of patches, wherein a patch of said series of patches includes a pattern of peaks;
computing a gradient image, $\nabla(P)$, of said image;
applying a low-pass filter, $f(\xi) > f(\xi_o) = 0$, to remove high frequency content;
reconstructing said image via inverse Fourier transform prior to calculating said first estimated count; and
detecting a number of local maximas in said reconstructed image after alignment and non-maximal suppression;
detecting repetitions of said pattern,
determining entropy, mean, variance, skewness, and kurtosis of said reconstructed image and of a difference image after detecting said peaks but prior to calculating said first estimated count, said difference image being an absolute difference between said reconstructed image and a gradient image of said image,
wherein a periodic occurrence of said peaks in said repetitions of said pattern indicate a first estimated count of said individuals in said patch based on a first granularity of said patch, said number of local maximas being an estimate for said first estimated count of said number of individuals in said image;
normalizing said first estimated count for a size of said patch;
detecting and localizing objects associated with said plurality of individuals in said image via head detection in order to automatically identify a second estimated count of said individuals in said patch based on a second granularity of said patch, wherein said second granularity of said patch is larger than said first granularity of said patch;
applying a filter corresponding to heads of said plurality of individuals during said step of detecting and localizing said objects;
detecting said local features in said patch, said local features that are associated with said individuals indicating a third estimated count of said individuals in said patch based on a third granularity of said patch wherein said third granularity of said patch is smaller than said first granularity of said patch;
receiving a database including a plurality of descriptions of local features that may or may not be associated with said individuals being counted in said patch, said descriptions including local features describing external objects that are not associated with said individuals being counted in said patch;
automatically discarding an external object included in said database from said third estimated count of said individuals in said patch, said third estimated count including said local features that are associated with said individuals less said local features that are not associated with said individuals;
incorporating scale and confidence into said first estimated count, said second estimated count, and said third estimated count for minimizing threshold of detection as a result of said image being occluded, wherein said first, second, and third estimated counts include said scales and confidences;
inputting said first estimated count, said second estimated count, and said third estimated into a multidimensional vector;
automatically sweeping each layer of said multidimensional vector to determine beliefs at said each layer of said multidimensional vector, resulting in a patch count for said patch, wherein an evaluation of data term or unary cost for said patch at a layer of said multidimensional vector is independent of layers above or below said layer, said step of sweeping each layer performed by conducting four (4) sweeps at a bottom layer of said multidimensional vector to determine said beliefs for intermediate nodes of said multidimensional vector above said bottom layer, followed by conducting four (4) sweeps at a second layer of said multidimensional vector above said bottom layer to determine said beliefs at said second layer;
repeating the foregoing sweeping step but beginning with sweeping said second layer, followed by sweeping said bottom layer;
applying a smoothness constraint to a spatial neighborhood of said patch to improve accuracy of said patch count using a Markov random field;
repeating the foregoing steps with each patch of said series of patches; and
automatically computing a resulting estimated count of said image based on said beliefs of said each patch.

* * * * *